US010810356B2

(12) United States Patent
Meriaz et al.

(10) Patent No.: US 10,810,356 B2
(45) Date of Patent: *Oct. 20, 2020

(54) VISUAL SEARCHING AND NAVIGATION

(71) Applicant: MBTE Holdings Sweden AB, Gothenburg (SE)

(72) Inventors: Ran Meriaz, Warner Robins, GA (US); Yoram Meriaz, Tel-Aviv (IL); Alex Tkachman, Holon (IL)

(73) Assignee: MBTE Holdings Sweden AB, Goeteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,809

(22) Filed: Jul. 17, 2019

(65) Prior Publication Data

US 2019/0340221 A1 Nov. 7, 2019

Related U.S. Application Data

(63) Continuation of application No. 14/694,385, filed on Apr. 23, 2015, now Pat. No. 10,394,938.

(60) Provisional application No. 61/986,498, filed on Apr. 30, 2014, provisional application No. 62/003,800, filed on May 28, 2014, provisional application No. 62/013,570, filed on Jun. 18, 2014, provisional
(Continued)

(51) Int. Cl.
*G06F 16/34* (2019.01)
*G06F 40/131* (2020.01)
*G06F 3/0484* (2013.01)
*G06F 40/14* (2020.01)
*G06F 40/40* (2020.01)
*G06F 40/55* (2020.01)

(52) U.S. Cl.
CPC .......... *G06F 40/131* (2020.01); *G06F 3/0484* (2013.01); *G06F 3/04842* (2013.01); *G06F 16/34* (2019.01); *G06F 40/14* (2020.01); *G06F 40/40* (2020.01); *G06F 40/55* (2020.01)

(58) Field of Classification Search
CPC combination set(s) only.
See application file for complete search history.

(56) References Cited

U.S. PATENT DOCUMENTS 5,373,441 A 12/1994 Hirai et al.
7,912,602 B2 3/2011 Sells et al.
(Continued)

*Primary Examiner* — Hien L Duong
(74) *Attorney, Agent, or Firm* — Alston & Bird LLP

(57) ABSTRACT

Embodiments of the present invention provide methods, systems, apparatuses, and computer program products for aiding user access to technical data for an item. In one embodiment a method is provided comprising providing a model of the item, wherein the model comprises a plurality of visual representations, each visual representation representing one or more components of the item; receiving input selecting at least one of the one or more visual representations; responsive to receiving input selecting the at least one of the one or more visual representations, identifying one or more topics associated with the selected visual representation; providing at least a portion of the one or more topics associated with the selected visual representation; receiving input selecting at least one of the one or more topics; and responsive to receiving input selecting a topic of the one or more topics, providing technical data associated with the topic.

20 Claims, 19 Drawing Sheets

Related U.S. Application Data application No. 62/017,407, filed on Jun. 26, 2014, provisional application No. 62/034,228, filed on Aug. 7, 2014, provisional application No. 62/103,609, filed on Jan. 15, 2015.

(56) References Cited

U.S. PATENT DOCUMENTS

| | | | |
|---|---|---|---|
| 8,245,150 B2 | 8/2012 | Katter, Jr. et al. | |
| 8,401,687 B2 | 3/2013 | Kohlhoff | |
| 8,620,627 B2 | 12/2013 | Nakhle et al. | |
| 9,135,372 B2* | 9/2015 | Delarue | G06T 17/005 |
| 9,183,681 B2 | 11/2015 | Fish | |
| 9,207,666 B2 | 12/2015 | Nixon et al. | |
| 2001/0056385 A1 | 12/2001 | Timms et al. | |
| 2002/0191848 A1* | 12/2002 | Boose | G06K 9/00476 |
| | | | 382/181 |
| 2002/0194190 A1 | 12/2002 | Shema et al. | |
| 2003/0025734 A1 | 2/2003 | Boose et al. | |
| 2003/0055812 A1 | 3/2003 | Williams et al. | |
| 2003/0187751 A1 | 10/2003 | Watson et al. | |
| 2004/0167833 A1 | 8/2004 | Schickler | |
| 2004/0181548 A1 | 9/2004 | Thomas et al. | |
| 2004/0199434 A1 | 10/2004 | Tanaka et al. | |
| 2005/0049881 A1 | 3/2005 | Xun | |
| 2007/0198367 A1 | 8/2007 | Yamagata et al. | |
| 2010/0042283 A1* | 2/2010 | Kell | G06Q 10/06 |
| | | | 701/29.3 |
| 2010/0077320 A1* | 3/2010 | Lepore | G06F 40/151 |
| | | | 715/760 |
| 2010/0138701 A1 | 6/2010 | Costantino | |
| 2010/0175013 A1 | 7/2010 | Krauter et al. | |
| 2011/0004369 A1 | 1/2011 | Fournier et al. | |
| 2011/0072338 A1 | 3/2011 | Caldwell | |
| 2012/0115549 A1 | 5/2012 | Kim et al. | |
| 2012/0130521 A1 | 5/2012 | Kohlhoff | |
| 2013/0014012 A1 | 1/2013 | Boucher et al. | |
| 2013/0167015 A1 | 6/2013 | Hadley et al. | |
| 2013/0167016 A1 | 6/2013 | Hadley et al. | |
| 2013/0191078 A1 | 7/2013 | Batra | |
| 2013/0191708 A1* | 7/2013 | Song | H04L 67/20 |
| | | | 715/202 |
| 2013/0197899 A1 | 8/2013 | Roulland et al. | |
| 2013/0254640 A1 | 9/2013 | Hadley et al. | |
| 2014/0101534 A1 | 4/2014 | Choi | |
| 2014/0114617 A1 | 4/2014 | Newhard et al. | |
| 2014/0289667 A1 | 9/2014 | Van Vliembergen | |
| 2014/0298216 A1 | 10/2014 | Prazak et al. | |
| 2014/0308647 A1 | 10/2014 | Shimata et al. | |
| 2014/0365943 A1 | 12/2014 | Senesac | |
| 2015/0206099 A1 | 7/2015 | Bockx et al. | |
| 2015/0312427 A1 | 10/2015 | Roulland et al. | |

* cited by examiner

Contents
400

- BIKE
  - Overview
    - Mountain bicycle - Products cross-reference table
    - Mountain bicycle - Conditions cross-reference table
    - Mountain bicycle - Applicability cross-reference table
    - Mountain bicycle - Business rules
    - Bicycle - Description of how it is made
    - Bicycle - Description of function
    - Bicycle - Description attributed to crew
    - Bicycle - Pre-operation procedures (crew)
    - Bicycle - Normal operation procedures (crew)
    - Bicycle - Post-operation procedures (crew)
    - Bicycle - Other procedures to clean
    - Bicycle - Place on test stand
    - Bicycle - Standard repair procedures
    - Bicycle - Illustrated Parts Data - IPD
    - Bicycle - Normal operation procedures (crew)
    - Bicycle - Normal operation procedures (crew)
  - Scheduled Maintenance
    - Time Limits
      - Bicycle - Time limits
    - Lists
      - Bicycle - Scheduled maintenance lists
    - Checks
      - Bicycle - Scheduled maintenance checks
  - Wheel
    - Wheel - Description of how it is made
    - Front Wheel
      - Inner tube - Remove and install a new item Visual Search —405
Filter Contents —410

FIG. 5

Front Wheel Assembly
    Front Wheel
    Front Tire
    Hub
    Valve
    Spokes
Front Assembly
    Fork
    Shock Absorber
    Front Brakes
        Break Pads
        Calipers
        Cable
        Hand Lever
    Handle Bar Grip
    Head Tube
    .
    .
    .
Saddle Assembly
    Seat Post
    Saddle
        Mounting Bracket
        Mounting Bolt
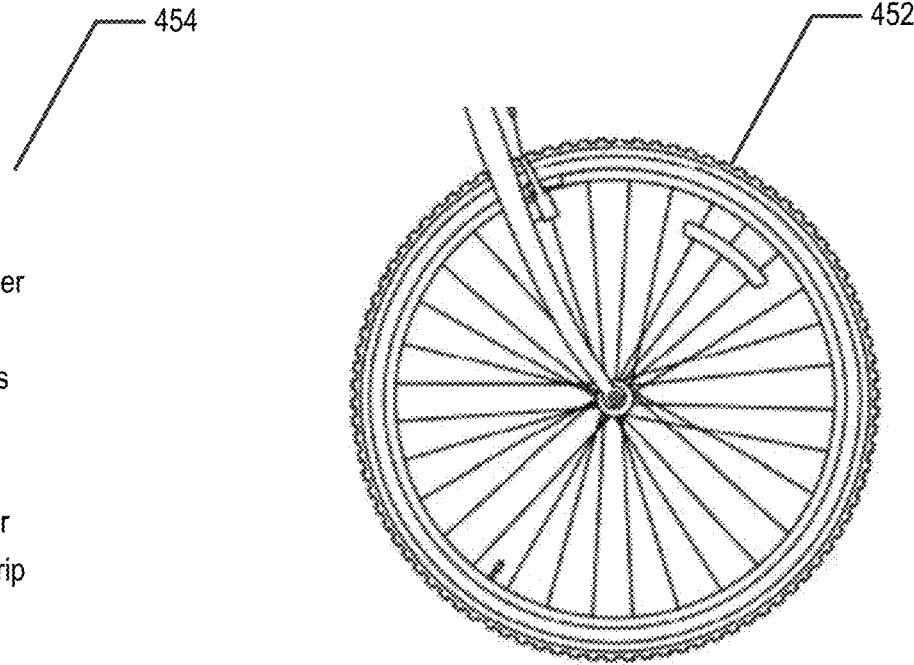
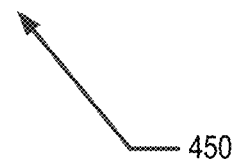
FILTER PART LIST BY DIAGRAM
FIG. 13A Front Wheel Assembly
    Front Wheel
    Front Tire     458
    Hub
    Valve
    Spokes
Front Assembly
    Fork
    Front Brakes
        Break Pads
        Calipers

VISUAL SEARCHING AND NAVIGATION

CROSS-REFERENCE TO RELATED APPLICATIONS

This application is a continuation of U.S. application Ser. No. 14/694,385 filed Apr. 23, 2015, which claims priority to U.S. Provisional Application No. 61/986,498 filed Apr. 30, 2014, U.S. Provisional Application No. 62/003,800 filed May 28, 2014, U.S. Provisional Application No. 62/013,570 filed Jun. 18, 2014, U.S. Provisional Application No. 62/017,407 filed Jun. 26, 2014, U.S. Provisional Application No. 62/034,228 filed Aug. 7, 2014, U.S. Provisional Application No. 62/103,609 filed Jan. 15, 2015, which are hereby incorporated herein in their entireties by reference.

BACKGROUND

Technical Manuals and other technical data generally hold large amounts of information that can include multiple volumes and hundreds or thousands of data modules when in electronic format. When users of technical manuals, or other technical data that are provided electronically, need to look for a specific subject, they need to go over a lengthy electronic Table of Contents, similar to a paper book, but using links, which can include nested subsystems (and sub-subsystems) within systems. This requires the users to know not only the exact nomenclature of the item they seek (many times this is unknown), but how to navigate through the seemingly endless array of nested data. This results in a lot of time spent by the reader, trying to look in many different places (and sometimes, out of exasperation, just look from A to Z) to find the information, which results in inefficiency, loss of time and waste of expensive resources.

Thus, there is a need in the art for methods, apparatuses, systems, and computer program products for efficiently providing technical information to users in a user-friendly manner.

BRIEF SUMMARY

Embodiments of the present invention provide methods, systems, apparatuses, and computer program products for efficiently providing technical information to users in a user-friendly manner. In accordance with one aspect of the present invention, a method for aiding user access to technical data for an item is provided. In one embodiment, the method comprises (a) providing a model of the item, wherein the model comprises a plurality of visual representations, each visual representation representing one or more components of the item; (b) receiving input selecting at least one of the one or more visual representations; (c) responsive to receiving input selecting the at least one of the one or more visual representations, identifying one or more topics associated with the selected visual representation; (d) providing at least a portion of the one or more topics associated with the selected visual representation; (e) receiving input selecting at least one of the one or more topics; and (f) responsive to receiving input selecting a topic of the one or more topics, providing technical data associated with the topic.

In accordance with another aspect of the present invention a computing system is provided. In one embodiment, the computing system comprises at least one processor and at least one memory including computer program code. The at least one memory and the computer program code are configured to, with the processor, cause the apparatus to at least (a) provide a model of the item, wherein the model comprises a plurality of visual representations, each visual representation representing one or more components of the item; (b) receive input selecting at least one of the one or more visual representations; (c) responsive to receiving input selecting the at least one of the one or more visual representations, identify one or more topics associated with the selected visual representation; (d) provide at least a portion of the one or more topics associated with the selected visual representation; (e) receive input selecting at least one of the one or more topics; and (f) responsive to receiving input selecting a topic of the one or more topics, provide technical data associated with the topic.

In accordance with yet another aspect of the present invention, a computer program product is provided. In one embodiment, the computer program product comprise at least one non-transitory computer-readable storage medium having computer-readable program code portions stored therein. The computer-readable program code portions comprise (a) an executable portion configured to provide a model of the item, wherein the model comprises a plurality of visual representations, each visual representation representing one or more components of the item; (b) an executable portion configured to receive input selecting at least one of the one or more visual representations; (c) an executable portion configured to, responsive to receiving input selecting the at least one of the one or more visual representations, identify one or more topics associated with the selected visual representation; (d) an executable portion configured to provide at least a portion of the one or more topics associated with the selected visual representation; (e) an executable portion configured to receive input selecting at least one of the one or more topics; and (f) an executable portion configured to, responsive to receiving input selecting a topic of the one or more topics, provide technical data associated with the topic.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
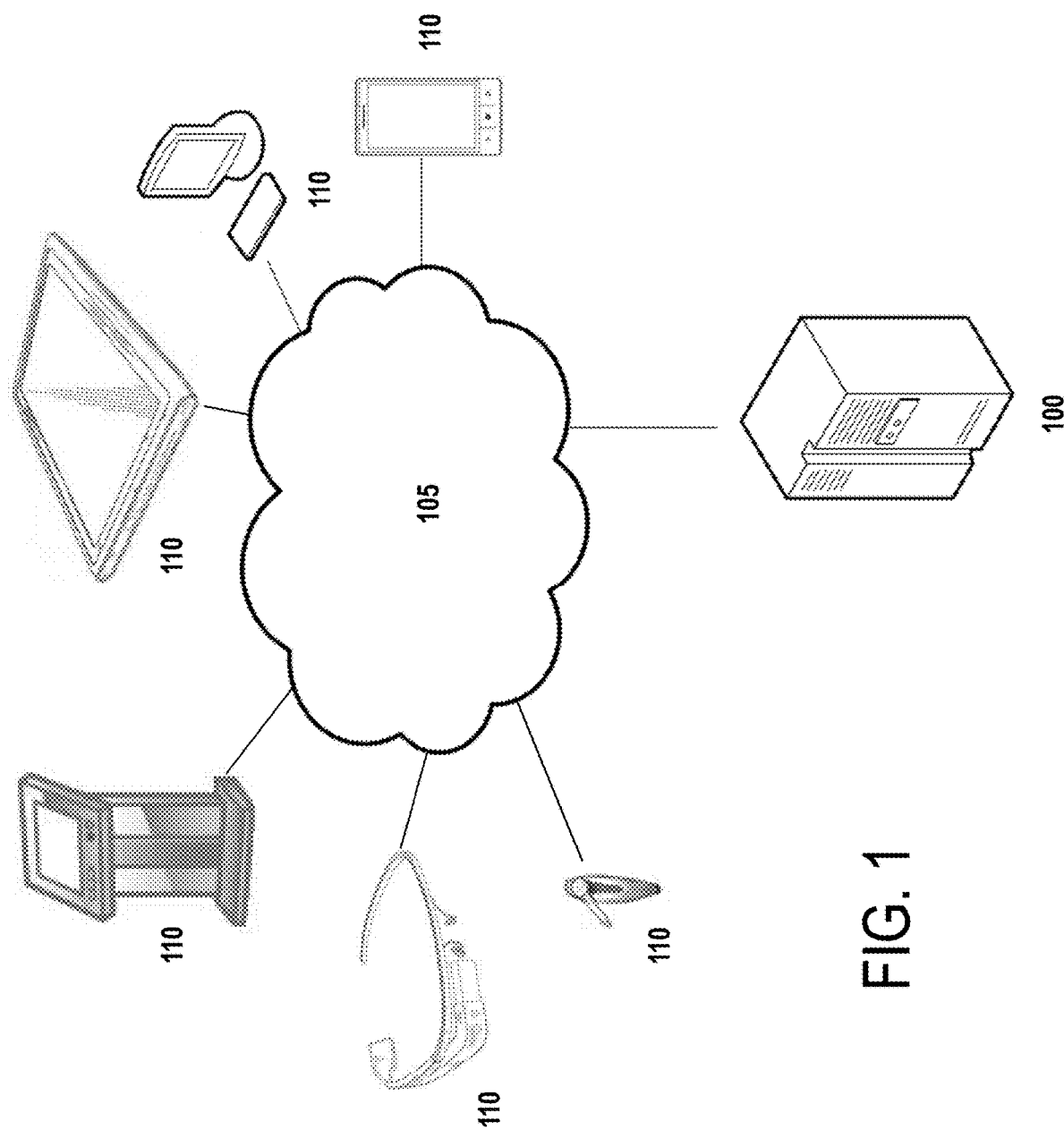
FIG. 1 is an overview of a system that can be used to practice embodiments of the present invention.

FIGS. 4, 6, 9, 11, 14, 15, 16, 18, 19, and 20 are flow charts illustrating various procedures and operations that may be completed in accordance with various embodiments of the present invention; and FIGS. 5, 7, 8, 10, 12, 13A, 13B, 17A, and 17B illustrate example views of the interactive user interface, in accordance with various embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more management computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entity

Figure 2:
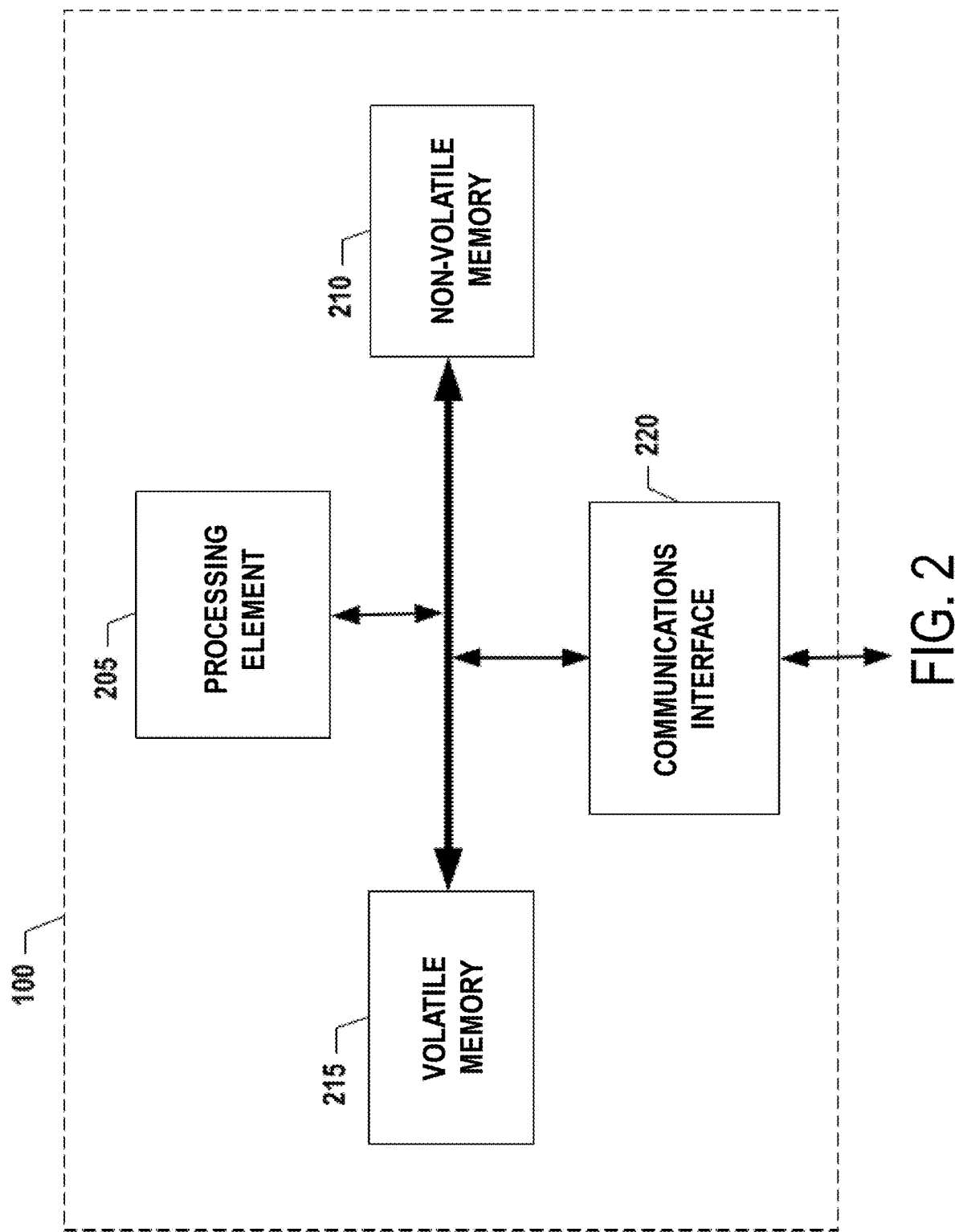
FIG. 2 is an exemplary schematic diagram of a management computing entity according to one embodiment of the present invention.

FIG. 2 provides a schematic of a management computing entity 100 according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user computing entities 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
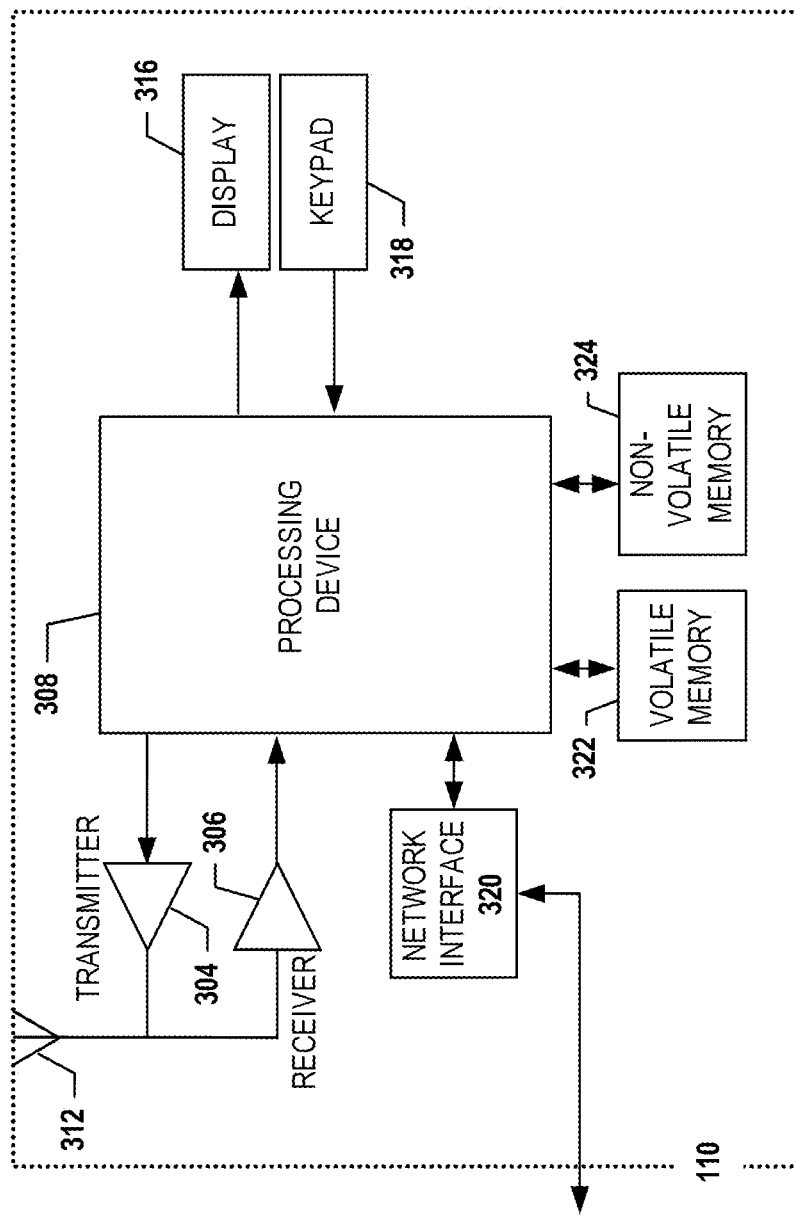
FIG. 3 is an exemplary schematic diagram of a user computing entity according to one embodiment of the present invention.

A user may be an individual, a family, a company, an organization, an entity, a department within an organization, a representative of an organization and/or person, and/or the like. To do so, a user may operate a user computing entity 110 that includes one or more components that are functionally similar to those of the management computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

III. EXEMPLARY SYSTEM OPERATION

As described above, the management computing entity 100 and/or user computing entity 110 may be configured for storing technical data associated with an item, providing technical data associated with an item to a user, providing tools for a user accessing technical data associated with an item and/or aiding in user access of technical data associated with an item. In various embodiments, the technical data associated with the item may be stored and/or provided in accordance with S1000D standards and/or a variety of other standards. According to various embodiments, the management computing entity 100 and/or user computing entity 110 provides and/or aids in the access of technical data in accordance with user instructions and/or input received via the management computing entity 100 and/or user computing entity 110 (e.g., via a user interface). In various embodiments, a user interface (e.g., a browser, window, application, graphical user interface, and/or the like). The user interface may be accessible from a user computing entity 110 (e.g., in communication with the management computing entity 100 via the network 105). For example, in various embodiments, a user may log in to the management computing entity 100 from a user computing entity 110 (e.g., by opening a log-in page and entering a user ID and password using display 316 and keypad 318). The management computing entity 100 may be configured to recognize any such log-in request, verify that user has permission to access the system (e.g., by confirming the user ID and password are valid), and present/provide the user with a user interface (e.g., displayed on display 316). In other embodiments, user log-in is not required to access the user interface. Reference will now be made to FIGS. 4-19.

Figure 4:
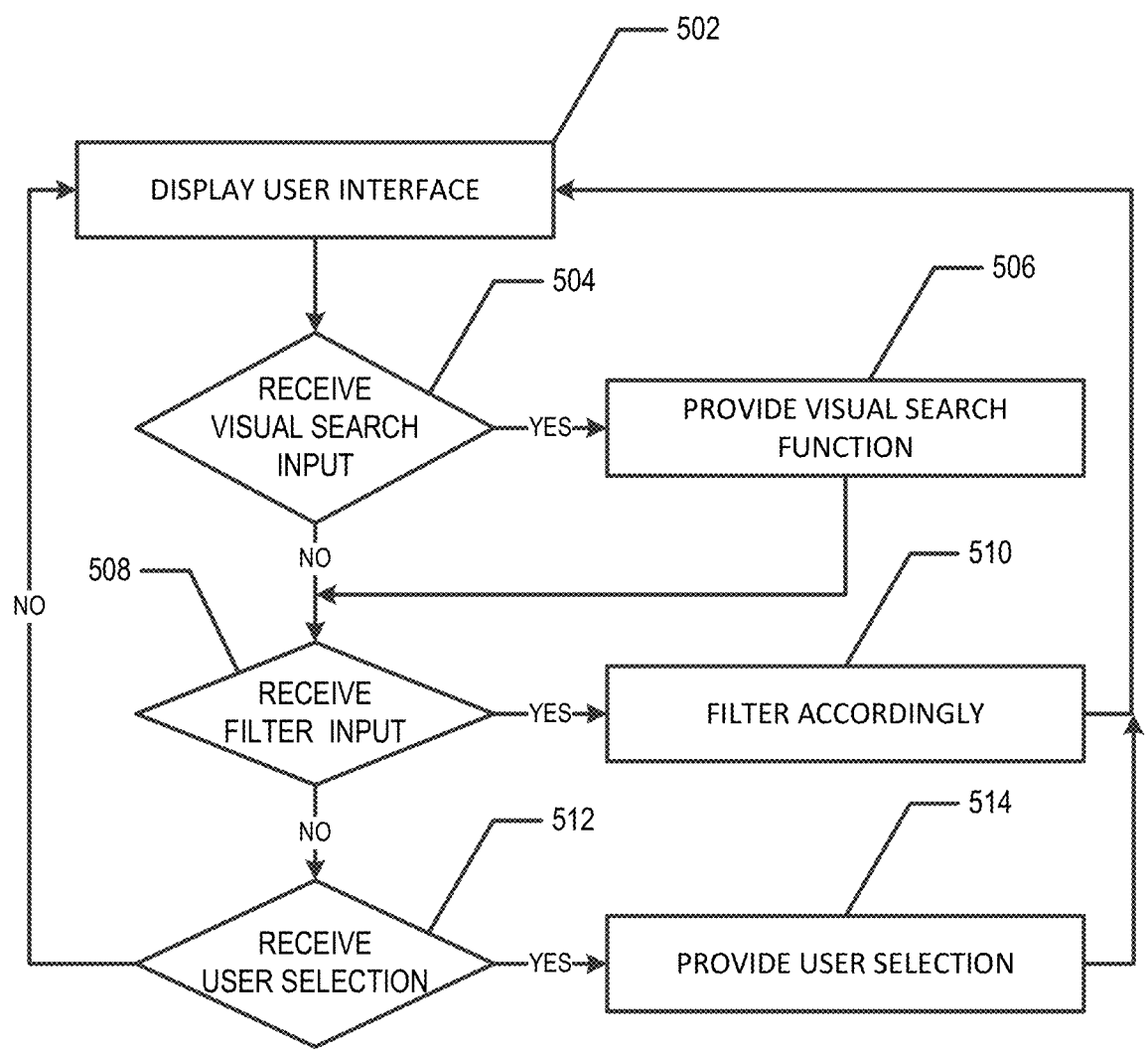

FIG. 4 is a flowchart providing a summary overview of some of the operations and procedures that may be completed in accordance with various embodiments. At step 502, the user interface can be provided. For example, the user interface may be displayed on display 316 of a user computing entity 110. In various embodiments, the user interface may be provided in a browser window, via a dedicated window, via an application, and/or the like. FIG. 5 illustrates an exemplary user interface 400 that may be provided to a user (e.g., operating a user computing entity 110). The user interface 400 may comprise a table of contents for the technical data associated with the item, a visual search button 405, and a filter contents button 410.

At step 504, it is determined if input indicating the user would like to access the visual search function has been received. For example, a user may select the visual search button 405 and, after the user selects the visual search button, or possibly in response thereto, the management computing entity 100 and/or user computing entity 110 may receive the input indicating the user would like to access the visual search function. At step 506, the visual search function can be provided to the user, as described in more detail below.

At step 508, it is determined if input indicating the user would like to filter the technical data associated with the item has been received. For example, the management computing entity 100 and/or the user computing entity 110 may receive input indicating the user would like to filter the technical data associated with the item. For example, a user may select the filter contents button 410. The user may provide one or more filter criteria for filtering (e.g., via the user interface operating on the user computing entity 110), as described in more detail elsewhere herein. At step 510, the one or more filter criteria are used to filter the provided information/data displayed via the user interface.

At step 512, it is determined if input indicating user selection/identification of a topic has been received. For example, the management computing entity 100 and/or the user computing entity 110 may receive input indicating user selection/identification of a topic. For example, each topic may be associated with at least one data module and may correspond to a component (e.g., assembly, sub-assembly, sub-sub-assembly, system, subsystem, sub-subsystem, part, and/or the like) of the item, a task or maintenance associated with the item or a component of the item, and/or the like. At step 514, the selected topic can be provided to the user via the user interface (e.g., operating on the user computing entity 110). The visual search function, filtering functions, and various other functions provided by various embodiments of the present invention will now be described in detail.

a. Visual Search

Figure 6:
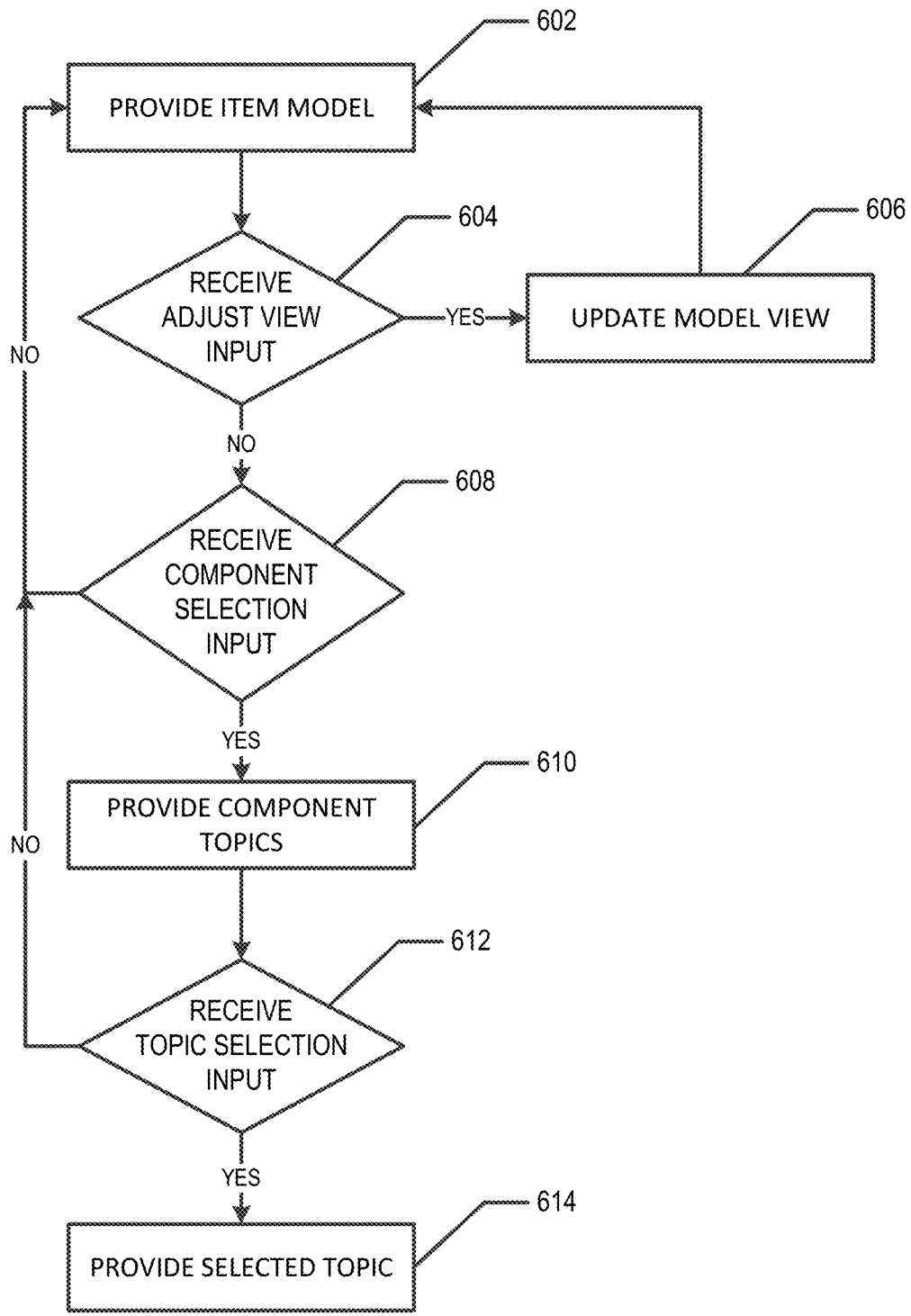
Figure 7:
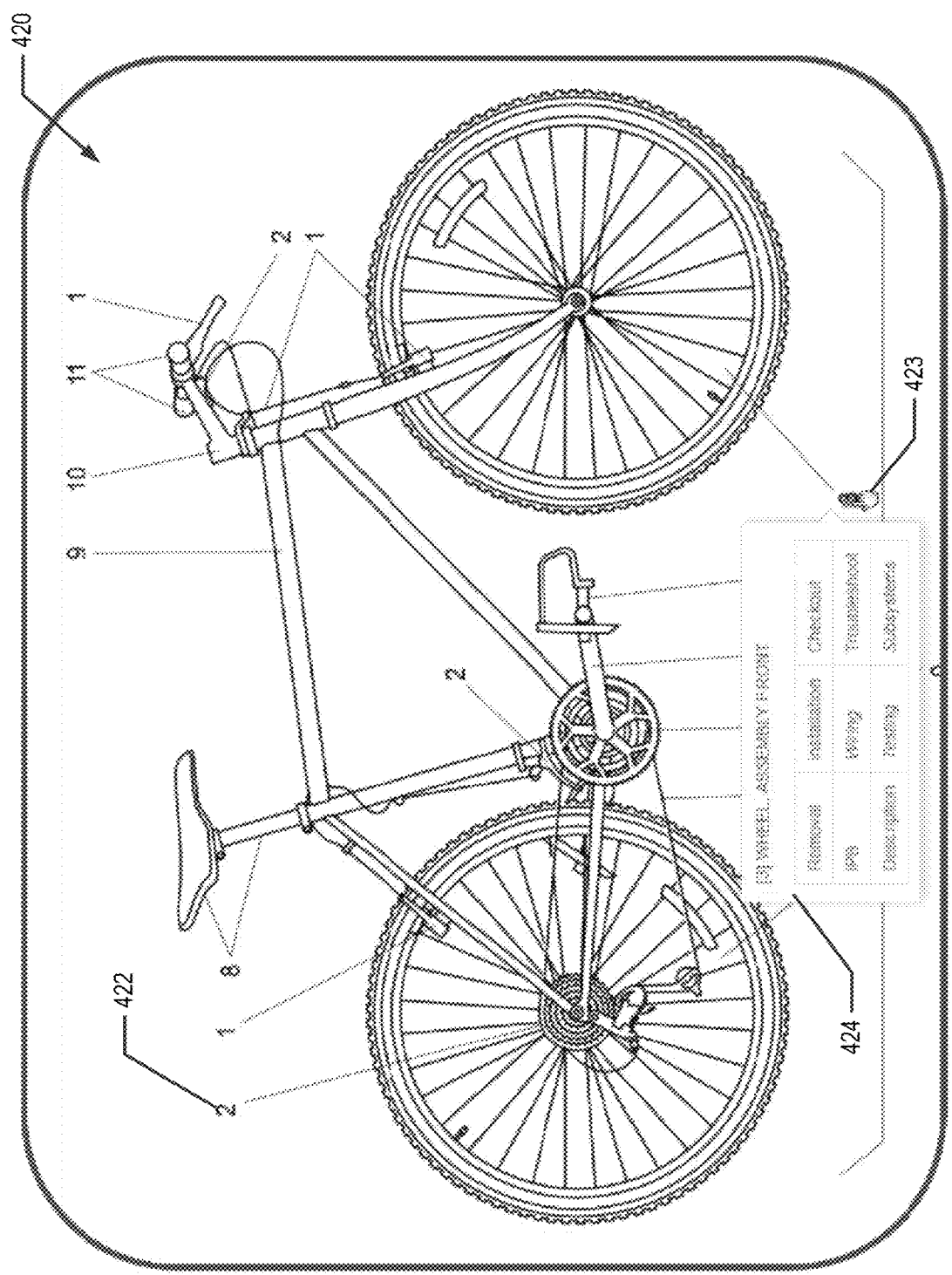

After receiving the input indicating the user would like to access the visual search function (e.g., at step 504), or possibly in response thereto, a model of the item can be provided, as shown in step 602 of FIG. 6. For example, the management computing entity 100 and/or user computing entity 110 may provide the model and/or cause the model to be displayed to the user (e.g., via the user computing entity 110). The model may comprise one or more visual representations. The model or visual representation may be a digital image in any of a variety of formats, such as JPEG, JFIF, JPEG2000, EXIF, TIFF, RAW, DIV, GIF, BMP, PNG, PPM, and/or the like. The model or visual representation may be a document in any of a variety of formats, such as DOCX, HTMLS, TXT, PDF, and/or the like. The model or visual representation may be a video in any of a variety of formats, such as MOV, AVI, MP4, MKV, and/or the like. Each model or visual representation may be configured to represent one or more components of the item. For example, various visual representations may be configured to represent assemblies, sub-assemblies, sub-sub-assemblies, systems, subsystems, sub-subsystems, individual parts, and/or the like associated with the item. FIG. 7 illustrates an exemplary model 420 wherein the item is a bicycle. Component callouts 422 indicate the visual representations comprising the model 420 and provide information as to which components the component callouts represent. For example, the selected callout 423 indicates that the indicated visual representation represents the front wheel assembly, as shown by the component topics window 424. In various embodiments, a topic may comprise data/information associated with a component, instructions for performing a task relevant to a component, data/information associated with the item, instructions for performing a task associated with the item or a component thereof (e.g., repair, maintenance, modification and/or the like tasks), links to other relevant topics or references, and/or the like.

Figure 8:
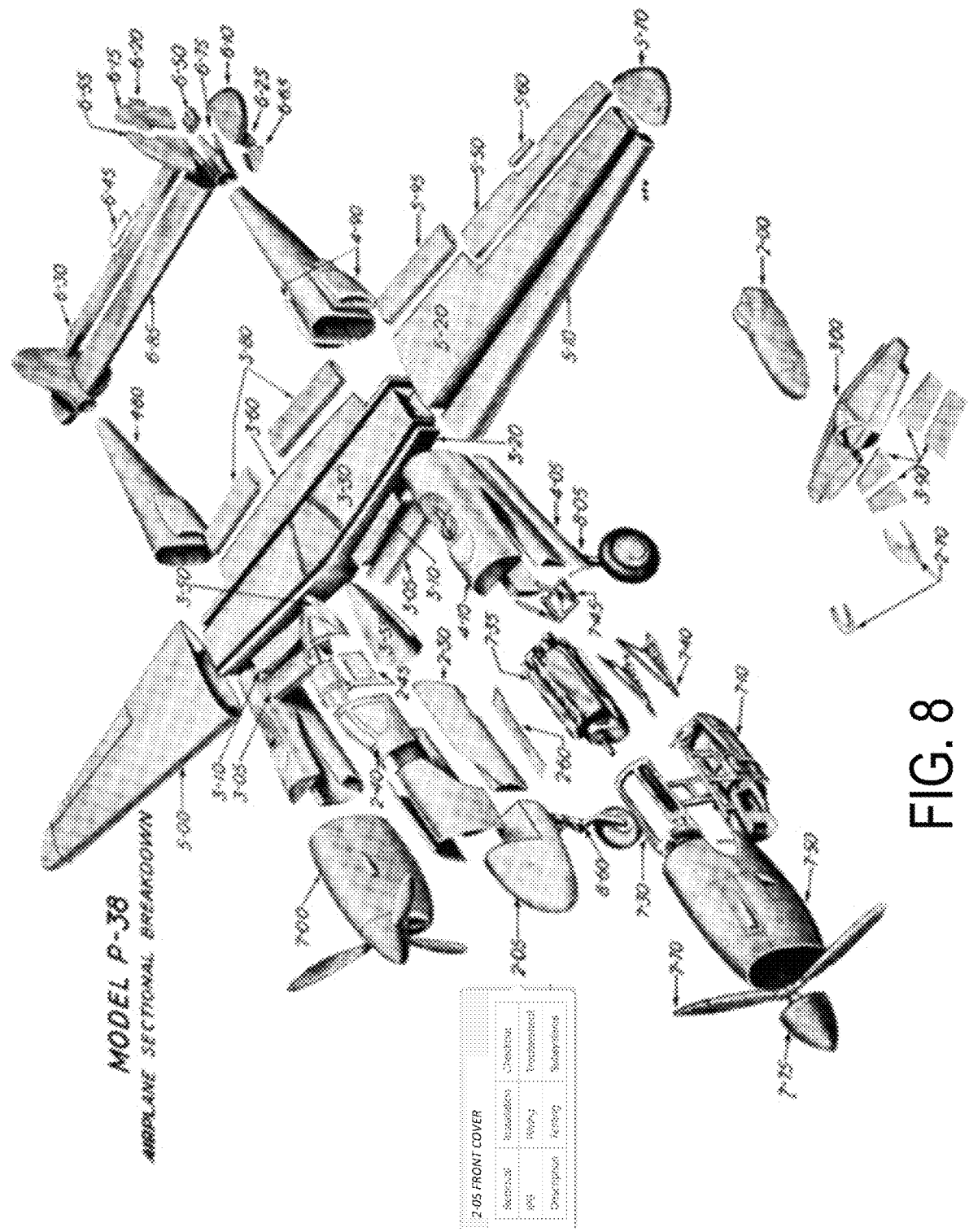

In various embodiments, the model may be provided as an exploded view, top view, side view, bottom view, front view, back view, cross-sectional view, or partial view of the item. In various embodiments, the model may be provided in other views, as appropriate for the application. In various embodiments, the model may be provided as a two-dimensional view of the item or as a three-dimensional view which, in some embodiments, may be manipulated to provide various views. In various embodiments, the user interface may provide model view adjustment options. For example, a user may request to change the view of the model (e.g., a side view may be provided and the user may request a top view), rotate the model, zoom in and/or out, and/or the like. FIGS. 7 and 8 provide examples of models wherein FIG. 7 is a two-dimensional model of a bicycle provided as a side view and FIG. 8 is a three-dimensional model of an aircraft provided as an exploded view. At step 604, as shown in FIG. 6, it is determined if view adjustment input has been received. If, at step 604, it is determined that view adjustment input has been received, then (e.g., in response thereto) the view adjustment is made and the updated model can be provided at step 606. For example, the management computing entity 100 and/or user computing entity 110 may adjust the view as requested and provide the updated model to the user (e.g., via the user computing entity 110).

If, at step 604, it is determined that view adjustment input has not been received, then at step 608 it is determined if input indicating user selection/identification of a component has been received. For example, a user (e.g., operating a user computing entity 110) may use a mouse to click on or hover over a component or component callout 422 or use a stylus or finger to select a component or component callout 422, such that input may be received by the management computing entity 100 and/or user computing entity 110. After receiving input indicating user selection/identification of a component, or in response thereto, a list of topics (e.g., a list of links to topics) associated with the selected component are provided at step 610. For example, the management computing entity 100 and/or the user computing entity 110 may provide a list of topics associated with the selected component to the user (e.g., via the user interface). For example, a component topics window 424 may be displayed (e.g., via display 316) listing topics associated with the component indicated by the selected callout 423. In various embodiments, the component topics window 424 may be a tool tip, dialog box, tear-off window, and/or the like.

In the exemplary user interface illustrated in FIG. 7, the selected callout 423 is the component callout corresponding to the front wheel assembly of the bicycle. Component topics window 424 provides a list of topics related to the front wheel assembly of the bicycle. For example, the component topics window 424 lists topics such as removal of the front wheel assembly, an illustrated parts breakdown (IPB) of the front wheel assembly, a description of the front wheel assembly, installation of the front wheel assembly, troubleshooting the front wheel assembly, and other topics associated with the front wheel assembly. For other items, links to other topics may be available via the component topics window 424 such as wiring information/data, testing information/data, sub-systems or sub-assemblies of the selected component, regular maintenance information/data, and/or the like as appropriate for the item and selected component.

Returning to FIG. 6, at step 612 it is determined if input selecting a topic from the list of topics has been received. For example, a user (e.g., operating a user computing entity 110) may select a topic from the component topics window 424. The management computing entity 100 and/or the user computing entity 110 may receive input indicating the user's selection of a topic. After the input selecting the topic is received, or in response thereto, the selected topic can be provided, at step 614. For example, if the list of topics can be provided as a list of links to each topic, the selected link (e.g., the link corresponding to the selected topic) may be followed to the data module associated with the selected topic. For example, the management computing entity 100 and/or user computing entity 110 may provide the selected topic by accessing the data module associated with the selected topic. For example, if the user (e.g., operating a user computing entity 110) selected the topic "removal" associated with the front wheel assembly, the corresponding data module will be accessed and information/data associated with removal of the front wheel assembly can be provided to the user (e.g., via the user interface operating on and/or displayed via the user computing entity 110). As will be recognized, a variety of approaches and techniques can be used to provide a visual search and/or table of contents configured to allow a user to access information associated with an item without querying the information based on technical terminology related to the item.

b. Link Preview

Figure 9:
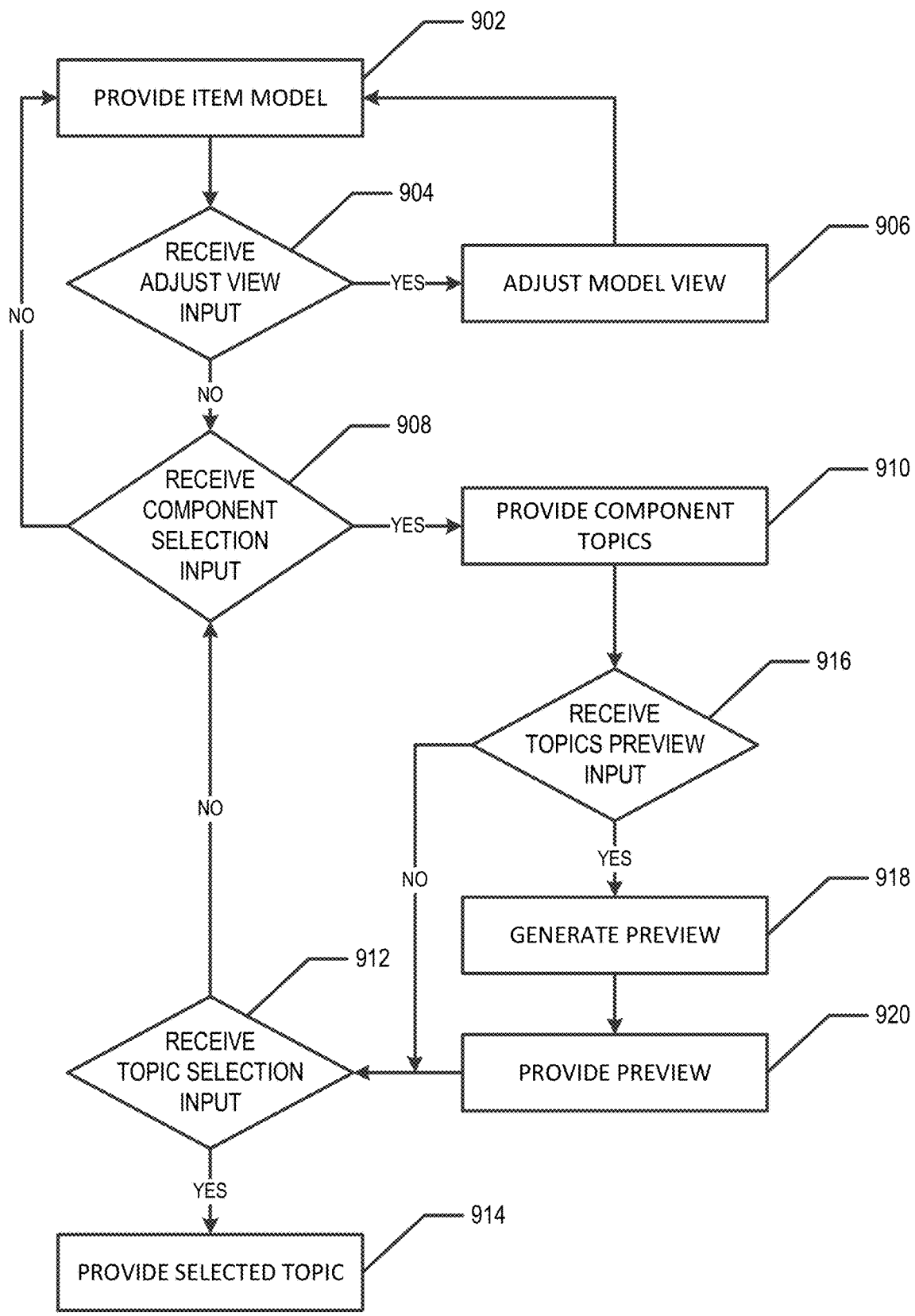

In various embodiments, a link preview may be provided by an appropriate computing entity. For example, a user (e.g., operating a user computing entity 110) may request that link previews be provided (e.g., via a settings menu, user preferences associated with a user profile, in response to certain actions/triggers, and/or the like). FIG. 9 provides a flowchart similar to that illustrated in FIG. 6 for various embodiments configured to provide a link preview. Starting at step 902, a model of the item can be provided. For example, the management computing entity 100 and/or user computing entity 110 may provide the model and/or cause the model to be displayed to the user (e.g., via the user computing entity 110). The model may comprise one or more visual representations. Each visual representation may be configured to represent one or more components of the item. For example, various visual representations may be configured to represent assemblies, sub-assemblies, sub-sub-assemblies, systems, subsystems, sub-subsystems, individual parts, and/or the like associated with the item. FIG. 7 illustrates an exemplary model 420 wherein the item is a bicycle.

In various embodiments, the model may be provided as an exploded view, top view, side view, bottom view, front view, back view, cross-sectional view, partial view, and/or the like. In various embodiments, the model may be provided as a two-dimensional view of the item or as a three-dimensional view which, in some embodiments, may be manipulated to provide various views. In various embodiments, the user interface may provide model view adjustment options. For example, a user may request to change the view of the model (e.g., a side view may be provided and the user may request a top view), rotate the model, zoom in and/or out, and/or the like. At step 904, as shown in FIG. 9, it is determined if view adjustment input has been received. If, at step 904, it is determined that view adjustment input has been received, then, perhaps in response thereto, the view adjustment is made and the updated model can be provided at step 906. For example, the management computing entity 100 and/or user computing entity 110 may adjust the view as requested and provide the updated model to the user (e.g., via the user computing entity 110).

If, at step 904, it is determined that view adjustment input has not been received, then at step 908 it is determined if input indicating user selection/identification of a component has been received. For example, a user (e.g., operating a user computing entity 110) may use a mouse to click on or hover over a component or component callout 422 or use a stylus or finger to select a component or component callout 422, such input may be received by the management computing entity 100 and/or user computing entity 110. After receiving input indicating user selection/identification of a component, or in response thereto, a list of topics (e.g., a list of links to topics) associated with the selected component are provided at step 910. For example, the management computing entity 100 or the user computing entity may provide topics associated with the selected component to the user (e.g., via the user computing entity 110). For example, a component topics window 424 may be displayed (e.g., via display 316) providing a list of topics associated with the component indicated by the selected callout 423. In various embodiments, the component topics window 424 may be a tool tip, dialog box, tear-off window, and/or the like.

In the exemplary user interface illustrated in FIG. 7, the selected callout 423 is the component callout corresponding to the front wheel assembly of the bicycle. Component topics window 424 provides a list of topics related to the front wheel assembly of the bicycle. For example, the component topics window 424 provides topic options such as removal of the front wheel assembly, an illustrated parts breakdown (IPB) of the front wheel assembly, a description of the front wheel assembly, installation of the front wheel assembly, troubleshooting the front wheel assembly, and other topics. For other items, other topics may be available via the component topics window 424 such as wiring information/data, testing information/data, subsystems or sub-assemblies of the selected component, regular maintenance information/data, and/or the like as appropriate for the item and selected component.

Returning to FIG. 9, at step 916 it is determined if input requesting a link preview has been received. For example, a user (e.g., operating a user computing entity 110) may use a mouse to click on, right click on, or hover over a topic in the component topics window 424 or use a stylus or finger to select a topic in the component topics window 424, such input may be received by the management computing entity 100 and/or user computing entity 110. After receiving input indicating user selection/identification of a topic, or in response thereto, a link preview is generated at step 918. For example, the management computing entity 100 and/or the user computing entity 110 may access the data module associated with the selected topic and generate a topic preview. For example, for a particular topic, a user will be provided with a page/screen/window/user interface view providing information/data, tables, instructions, figures, links to additional and/or related information, and/or the like associated with the selected topic. The generated link preview may provide a preview of the first five to fifty lines, for example, of the page/screen/window/user interface view that the user would be provided with if the user selected the topic.

Figure 10:
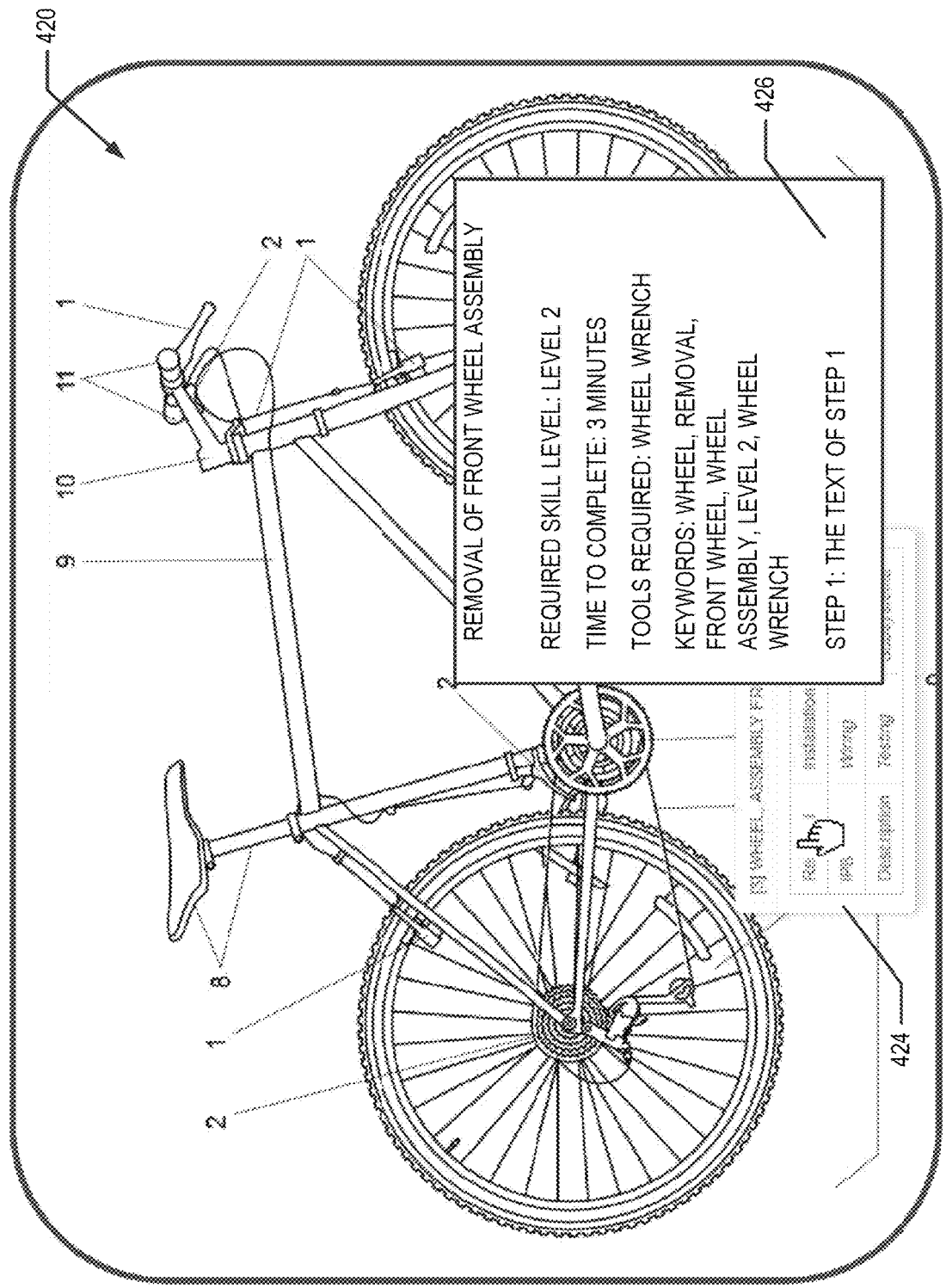

At step 920, the link preview can be provided to the user (e.g., via the user computing entity 110). FIG. 10 provides an exemplary view of a user interface providing a link preview. For example, the user (e.g., operating a user computing entity 110) has selected the topic "removal" associated with the front wheel assembly. In response to receiving input indicating selection of the topic "removal" from the component topics window 424, the management computing entity 100 and/or the user computing entity 110 accessed the data module associated with removal of the front wheel assembly and generated and provided the link preview 426. For example, the link preview 426 may be displayed (e.g., via display 316) providing a preview of the information/data associated with the selected topic. In various embodiments, the link preview 426 may be provided as a tool tip, dialog box, tear-off window, and/or the like.

Returning to FIG. 9, at step 912 it is determined if input selecting the topic has been received. For example, a user (e.g., operating a user computing entity 110) may select the topic from the component topics window 424 and/or link preview 426. For example, the user (e.g., operating a user computing entity 110) may "tear away" link preview 426, select a button in the link preview 426, double click the topic in the component topic window 424, and/or the like. After determining that input selecting a topic has been received, or in response thereto, the data module associated with the selected topic is accessed and the selected topic can be provided, at step 914. For example, the management computing entity 100 and/or user computing entity 110 may access the data module associated with the selected topic and provide the selected topic via the user interface. For example, if the user (e.g., operating a user computing entity 110) selected the "removal" topic associated with the front wheel assembly, information/data associated with removal of the front wheel assembly can be provided to the user (e.g., via the user computing entity 110).

In various embodiments, a link preview may be provided for any link provided via the user interface. For example, a link preview may be provided for topics provided in a table of contents or hierarchical list of topics and/or links to topics or references associated with an item. In various embodiments, a link preview may be provided for topics provided within a window/screen/page/user interface view for a particular item. For example, the page/screen/window/user interface view provided when the user selects the removal topic associated with the front wheel assembly may contain a link to the front wheel topic. If a user uses a mouse to select, right-click, hover over, and/or the like the link to the front wheel topic or uses a finger or stylus to select the link to the front wheel topic, a link preview may be provided. In particular, the link preview may provide the user (e.g., operating a user computing entity 110) to preview the page/screen/window/user interface view that would be reached by following a selected link. This may help the user decide if they wish to follow a selected link without following the link, preventing the user from needing to take the time to retrace his or her steps back to the page from which the link was followed. As will be recognized, a variety of approaches and techniques can be used to provide a link preview.

c. Smart Preview

Figure 12:
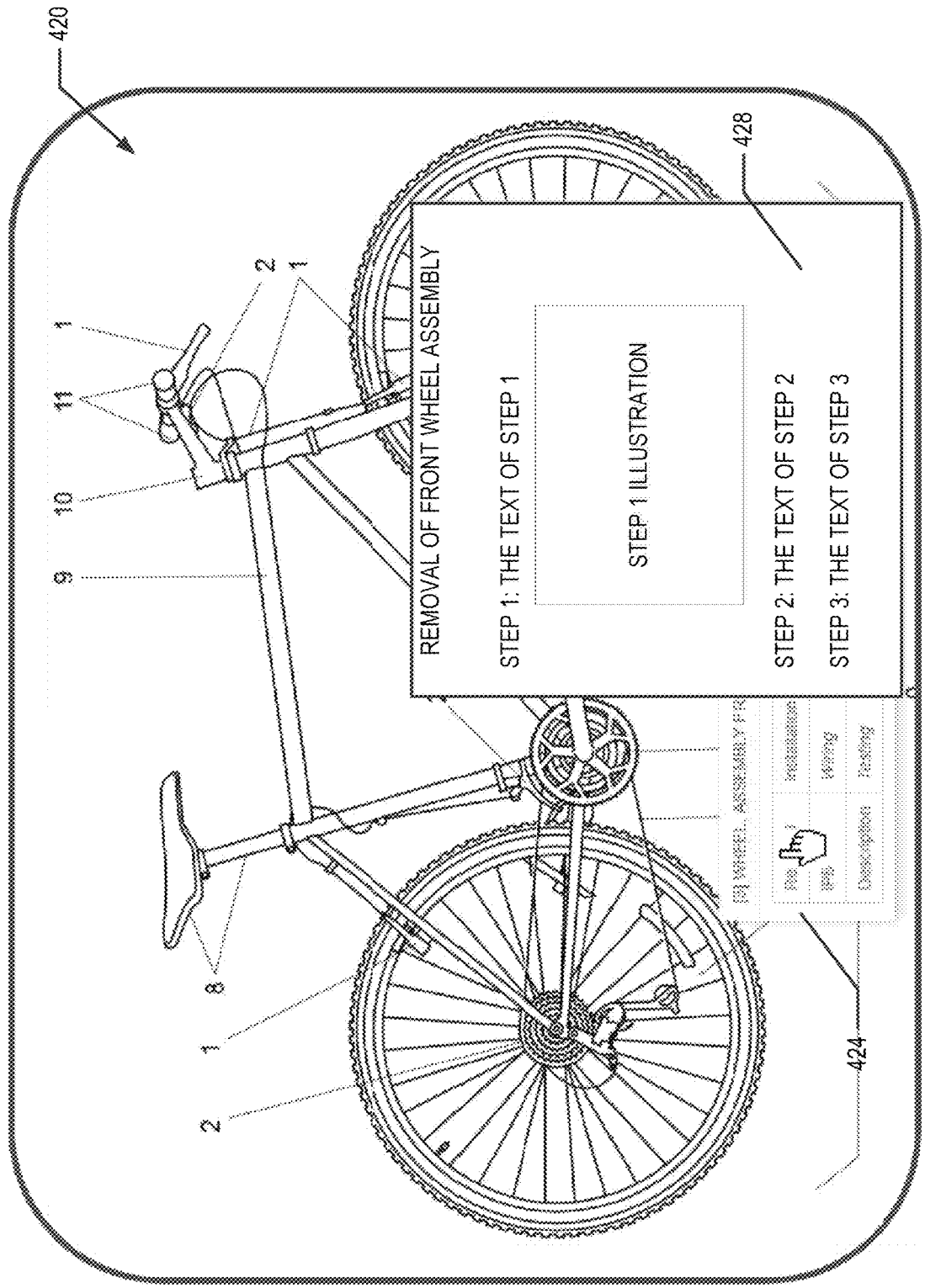

In various embodiments, a smart preview may be provided. In various embodiments, the information associated with the item may be stored in Standard Generalized Markup Language (SGML), Extensible Markup Language (XML), JavaScript Object Notation (JSON), or other file format using header data. Indeed, S1000D standard requires that data modules comprise a header section configured to identify the data module and provide status information comprising metadata for managing the data module (e.g., source information, security classification, applicability, change history, reason for change, verification status, and/or the like). The content portion of the data module may include further preface data (e.g., tables of relevant data, requirements for before a task is done, and/or the like). While this header and/or preface data may be important information, if included in the preview the preview may provide header and/or preface data and very little information directly related to the topic being previewed. For example, the link preview 426 shown in FIG. 10 includes header and/or preface data and only displays the first step of the selected topic. In contrast, the smart preview 428 shown in FIG. 12 provides more information directly related to the selected topic than the link preview 426.

Figure 11:
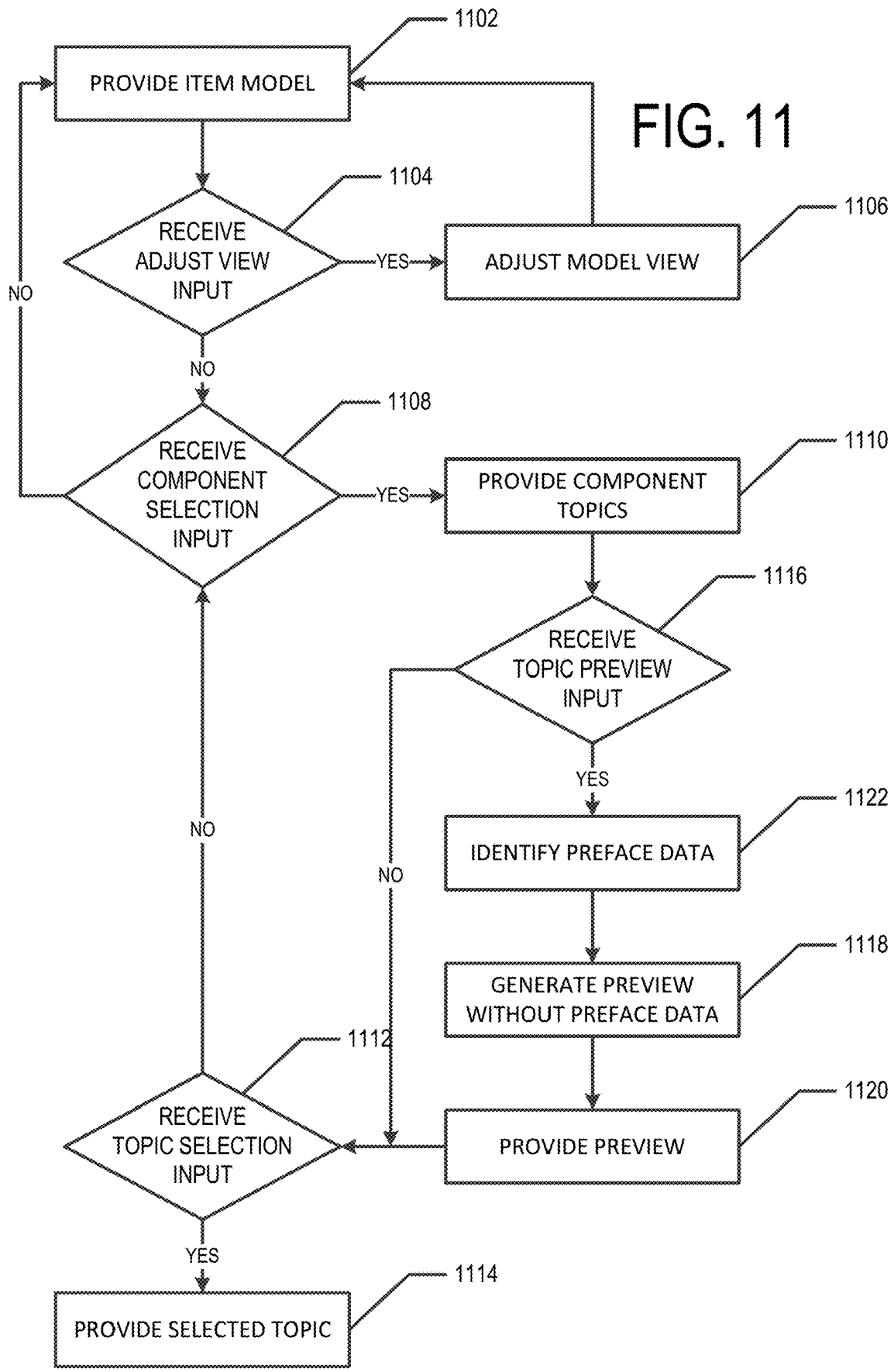

In various embodiments, a smart preview may be provided for one or more topics and/or links to topics. For example, a user (e.g., operating a user computing entity 110) may request that smart previews be provided (e.g., via a settings menu, user preferences associated with a user profile, and/or the like). FIG. 11 provides a flowchart similar to that illustrated in FIGS. 6 and 9, but for various embodiments configured to provide a smart preview. Starting at step 1102, a model of the item can be provided. For example, the management computing entity 100 and/or user computing entity 110 may provide the model and/or cause the model to be displayed to the user (e.g., via the user computing entity 110). The model may comprise one or more visual representations. Each visual representation may be configured to represent one or more components of the item. For example, various visual representations may be configured to represent assemblies, sub-assemblies, sub-sub-assemblies, systems, subsystems, sub-subsystems, individual parts, and/or the like associated with the item. FIG. 7 illustrates an exemplary model 420 wherein the item is a bicycle.

In various embodiments, the model may be provided as an exploded view, top view, side view, bottom view, front view, back view, cross-sectional view, or partial view of the item. In various embodiments, the model may be provided as a two-dimensional view of the item or as a three-dimensional view which, in some embodiments, may be manipulated to provide various views. In various embodiments, the user interface may provide model view adjustment options. For example, a user may request to change the view of the model (e.g., a side view may be provided and the user may request a top view), rotate the model, zoom in and/or out, and/or the like. At step 1104, as shown in FIG. 11, it is determined if view adjustment input has been received. If, at step 1104, it is determined that view adjustment input has been received, then, (e.g., in response thereto) the view adjustment is made and the updated model can be provided at step 1106. For example, the management computing entity 100 and/or user computing entity 110 may adjust the view as requested and provide the updated model to the user (e.g., via the user computing entity 110).

If, at step 1104, it is determined that view adjustment input has not been received, then at step 1108 it is determined if input indicating user selection/identification of a component has been received. For example, a user (e.g., operating a user computing entity 110) may use a mouse to click on or hover over a component or component callout 422 or use a stylus or finger to select a component or component callout 422. Such input may be received by the management computing entity 100 and/or user computing entity 110. After receiving input indicating user selection/identification of a component, or in response thereto, a list of topics (e.g., a list of links to topics) associated with the selected component are provided at step 1110. For example, the management computing entity 100 and/or the user computing entity 110 may provide a list of topics associated with the selected component to the user (e.g., via the user computing entity 110). For example, a component topics window 424 may be displayed (e.g., via display 316) providing topics associated with the component indicated by the selected callout 423. In various embodiments, the component topics window 424 may be a tool tip, dialog box, tear-off window, and/or the like.

In the exemplary user interface illustrated in FIG. 7, the selected callout 423 is the component callout corresponding to the front wheel assembly of the bicycle. The component topics window 424 provides links to topics related to the front wheel assembly of the bicycle. For example, the component topics window 424 provides options such as removal of the front wheel assembly, an illustrated parts breakdown (IPB) of the front wheel assembly, a description of the front wheel assembly, installation of the front wheel assembly, troubleshooting the front wheel assembly, and other topics. For other items, links to other topics may be available via the component topics window 424 such as wiring information/data, testing information/data, sub-systems or sub-assemblies of the selected component, regular maintenance information/data, and/or the like as appropriate for the item and selected component.

Returning to FIG. 11, at step 1116 it is determined if input requesting a smart preview has been received. For example, a user (e.g., operating a user computing entity 110) may use a mouse to click on, right click on, or hover over a topic in the component topics window 424 or use a stylus or finger to select a topic in the component topics window 424, such input may be received by the management computing entity 100 and/or user computing entity 110. After receiving input indicating user selection/identification of a topic, or in response thereto, the data module associated with the selected topic is accessed and the preface and/or header data stored in the data module for the topic is identified at step 1122. A smart preview is generated that does not include the preface and/or header data and that is based on the data module associated with the selected topic at step 1118. For example, the management computing entity 100 and/or the user computing entity 110 may access the data module associated with the topic, identify the preface and/or header data, and generate a topic preview that does not include the preface and/or header data. For example, if a particular topic is selected, a user will be provided with a page/screen/window/user interface view providing information/data, tables, instructions, figures, links to additional and/or related information, and/or the like associated with the selected topic. The generated link preview may provide a preview of the first five to fifty lines after the preface and/or header data, for example, of the page/screen/window/user interface view that the user would be provided with if the user selected to view the topic.

At step 1120, the smart preview can be provided to the user (e.g., via the user computing entity 110). FIG. 12 provides an exemplary view of a user interface providing a smart preview 428. For example, the user (e.g., operating a user computing entity 110) has selected the topic removal associated with the front wheel assembly. In response to receiving input indicating selection of the topic "removal" from the component topics window 242, the management computing entity 100 and/or the user computing entity 110 accessed the associated data module, identified the preface and/or header data stored in the data module, and generated and provided the smart preview 428. For example, the smart preview 428 may be displayed (e.g., via display 316) providing a preview of the information/data associated with the selected topic. In various embodiments, the smart preview 428 may be provided as a tool tip, dialog box, tear-off window, and/or the like.

Returning to FIG. 11, at step 1112 it is determined if input selecting the topic or a link for a topic has been received. For example, a user (e.g., operating a user computing entity 110) may select the topic from the component topics window 424 and/or smart preview 428. For example, the user (e.g., operating a user computing entity 110) may "tear away" smart preview 428, select a button in the smart preview 428, double click the topic in the component topic window 424, and/or the like. After determining that input selecting a topic has been received, or in response thereto, data module for the selected topic is accessed and the data/information stored therein can be provided, at step 1114. For example, the management computing entity 100 and/or user computing entity 110 may provide the selected topic via a page/screen/window/user interface view. For example, if the user (e.g., operating a user computing entity 110) selected the link associated with the removal topic associated with the front wheel assembly, information/data associated with removal of the front wheel assembly can be provided to the user (e.g., via the user computing entity 110).

In various embodiments, a smart preview may be provided for any link provided via the user interface. For example, a smart preview may be provided for topics and/or links to topics provided in a table of contents or hierarchical list of topics and/or links to topics associated with an item. In various embodiments, a smart preview may be provided for topics and/or links to topics provided within a screen/page/user interface view for a particular item. For example, the page/screen/window/user interface view provided when the user selects the removal topic associated with the front wheel assembly may contain a link to the front wheel topic. If a user uses a mouse to select, right-click, hover over, and/or the like to select the link to the front wheel topic or uses a finger or stylus to select the link to the front wheel topic, a smart preview may be provided. In particular, the smart preview may provide the user (e.g., operating a user computing entity 110) to preview the page/screen/window/user interface view that would be reached by following a selected link. This may help the user decide if they wish to follow a selected link without following the link, preventing the user from needing to take the time to retrace his or her steps back to the page from which the link was followed. As will be recognized, a variety of approaches and techniques can be used to provide a smart preview.

d. Filtering

In various embodiments, one or more methods for filtering information/data may be provided. For example, for items having many components a user may wish to filter the information/data provided. In another example, some information/data associated with an item may be classified at various security levels, a particular task may require a minimum skill level, and/or the like. Various filtering options will now be described in more detail.

i. Filter Parts List

In various embodiments, a parts list may be provided. For example, a hierarchical component list may be provided, as shown in FIG. 13A. For example, parts list user interface view 450 may comprise a parts list 454 and a diagram, model, or portion of a model 452. For example, in the illustrated parts list user interface view 450, a portion of the bicycle model 420 can be provided, in particular the portion of the model showing the front wheel assembly and how the front wheel assembly attaches to the frame of the bicycle. Indeed, in various scenarios it may be helpful to view diagrams and/or models or partial models showing particular components, assemblies, sub-assemblies, systems, subsystems, and/or the like. In some scenarios, a particular model view will only show some of the components of an item (e.g., the top view of a model representing an airplane may not show the landing gear). In scenarios where the diagram, model, or portion of a model 452 displays only visual representations representing only some of the components of the item, the parts list often still lists all of the components of the item.

Figure 14:
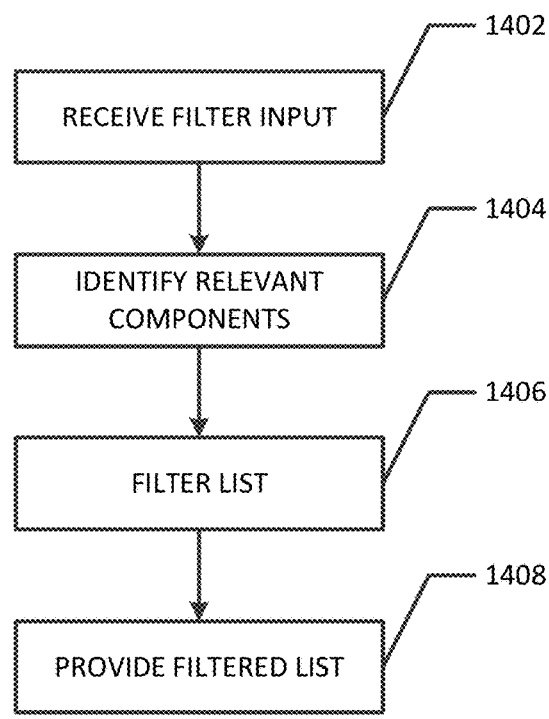

FIG. 14 provides an exemplary flowchart of processes, operations, and procedures that may be completed to filter a parts list 454 based on, for example, the diagram, model, or portion of a model 452 concurrently displayed by the illustrated parts list user interface view 450. For example, at step 1402, the filter input may be received. For example, the management computing entity 100 and/or the user computing entity 110 may receive filter input indicating the user would like the parts list 454 to be filtered based on the diagram, model, or portion of a model 452 currently being displayed (e.g., via the user computing entity 110). In one embodiment, the illustrated parts list user interface view 450 may comprise a filter part list by diagram button 456 and/or the like. In this example, the user may select the button 456 and after the user selects the button 456, or in response thereto, the management computing entity 100 and/or the user computing entity 110 may receive input indicating the user would like the parts list 454 to be filtered based on the diagram, model, or portion of a model 452 being displayed (e.g., via the user computing entity 110).

At step 1404, after receiving the filter input indicating the user would like the parts list 454 to be filtered based on, for example, the diagram, model, or portion of the model 452, or possibly in response thereto, the relevant components are identified. For example, after receiving the filter input, or in response thereto, the management computing entity 100 and/or user computing entity 110 may identify the relevant components of the item. For example, the relevant components of the item may be the components represented by visual representations in the diagram, model, or portion of a model 452 displayed by the illustrated parts list user interface view 450 (e.g., via the user computing entity 110). At step 1406, the parts list 454 may be filtered based on the identified relevant components. For example, the management computing entity 100 and/or the user computing entity 110 may filter the parts list 154 based on the identified relevant components.

Figure 13B:
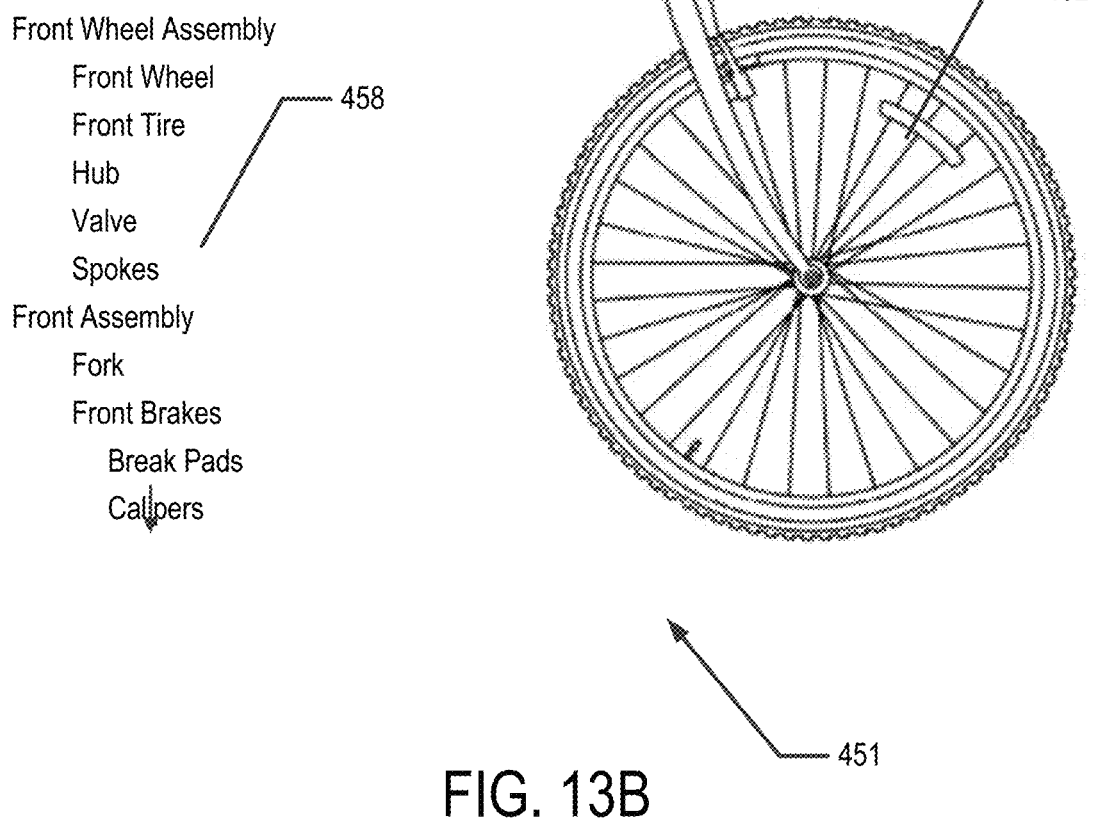

At step 1408, a filtered parts list can be provided. For example, the management computing entity 100 and/or the user computing entity 110 may provide the filtered parts list for display via the user interface (e.g., via the user computing entity 110). FIG. 13B provides an exemplary filtered illustrated parts list user interface view 451 comprising the diagram, model, or portion of the model 452 and the filtered parts list 458. The filtered parts list 458 may only consist of the components represented by visual representations in the diagram, model, or portion of the model 452. As should be understood, a variety of methods for filtering an illustrated parts list may be incorporated into various embodiments of the present invention.

ii. Filter by Component Level

In various scenarios a user may desire to search and/or browse a list of components, table of contents, model of an item or the like based on a component level. For example, a user may wish to view the assemblies and sub-assemblies, but not the sub-sub-assemblies or individual parts of an item. Therefore, various embodiments provide for a user to filter lists of components, tables of contents, and models based on a component level.

Figure 15:
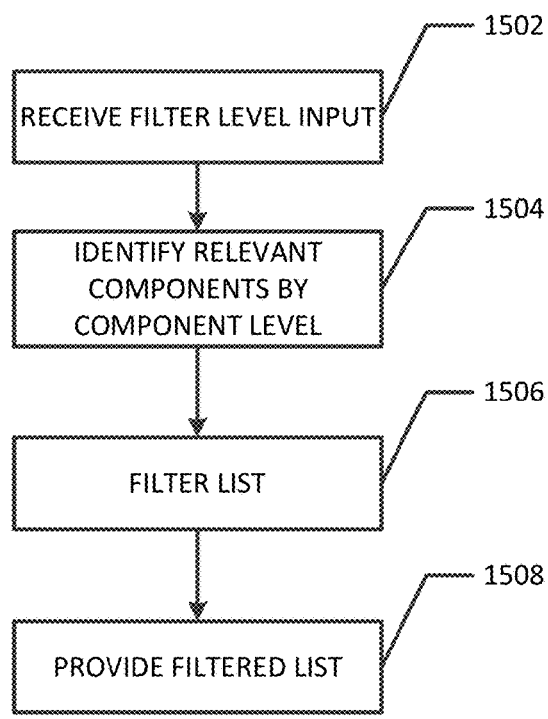

FIG. 15 provides an exemplary flowchart of processes and operations that may be completed to filter a list of components, table of contents, components represented by a model, or the like based on component level. At step 1502, filter level input is received. For example, the management computing entity 100 and/or the user computing entity 110 may receive filter level input indicating the component level(s) for which the user would like the list of components, table of contents, components represented by a model, or the like filtered. For example, the user may provide input via the user interface indicating that the list of components, table of contents components represented by the model and/or the like should be filtered to consist of only assemblies; assemblies and sub-assemblies; only sub-assemblies; assemblies, sub-assemblies, and sub-sub-assemblies; assemblies, sub-assemblies, sub-sub-assemblies, and parts; and/or the like. In various embodiments, the filter level input comprises a component level.

At step 1504, the relevant components are identified. For example, the management computing entity 100 and/or the user computing entity 110 may identify the relevant components. For example, the components having a component level equal to that of the level identified in the filter level input or components having a component level equal to or less than that of the level identified in the filter level input may be identified as relevant components. In some embodiments, the component level of a component may be identified by the number of dots in front of the component name. For example, names of some components might be "assembly 1," ".sub-assembly 1," ".part 1," "..sub-sub-assembly 1", "..part 2," "...sub-sub-sub assembly 1," "...part 3," and/or the like. For example, if the filter level input identified the filter level as one, components having zero or one dot in front of the name of the component will be identified. In one embodiment, the component level of a component may be identified based on the header and/or preface data stored in association with the data module for the topic. It should be understood that a variety of methods for identifying the component level of a component may be used when identifying the relevant components.

At step 1506, the component list, table of contents, visual representations comprising the model, and/or the like is/are filtered based on the identified relevant components and/or filter level input. For example. the management computing entity 100 and/or the user computing entity 110 may filter the component list, table of contents, visual representations comprising the model, and/or the like based on the identified relevant components and/or the filter level input. For example, the component list, table of contents, visual representations comprising the model and/or the like may be filtered to create a level-limited component list, table of contents, model, and/or the like that may consist of the identified relevant components. For example, the component list, table of contents, visual representations comprising the model and/or the like may be filtered to consist of the identified relevant components. At step 1508, the filtered component list, table of contents, visual representations comprising the model, and/or the like, can be provided. For example, the management computing entity 100 and/or user computing entity 110 may provide the filtered component list, table of contents, model, and/or the like. For example, the filtered component list, table of contents, model, and/or the like may be displayed to the user via the user interface (e.g., via the user computing entity 110). As will be understood, a variety of methods may be used to filter component lists, tables of contents, components illustrated in a model, and/or the like based on the component level associated with each component.

iii. Multi-Configuration Filter

In various embodiments, a user may wish to filter the components and/or topics associated with an item based on various filter criteria. Example filter criteria may comprise an item identifier (e.g., a specific tail number, a unit number, serial number, vehicle identification number (VIN), block or series number, and/or the like), an item make and/or model identifier, a modification identifier (e.g., identifying modifications associated with the item, whether the item is pre-modification or post-modification), a location (e.g., a geographical location), a security level, a skill level, a skill code (e.g., military, aviation, and/or industry skill codes), mission type, and/or the like and/or combinations thereof. In various embodiments, the filter criteria may be provided by a user (e.g., operating a user computing entity 110), associated with a user profile, and/or the like.

Figure 16:
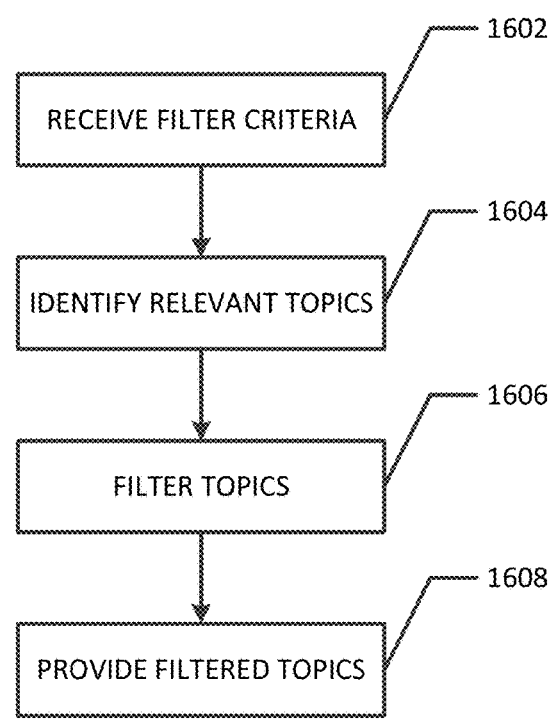

FIG. 16 provides a flowchart illustrating processes and operations that may be completed in various embodiments of the present invention. At step 1602, filter criteria input is received. For example, the management computing entity 100 and/or the user computing entity 110 may receive filter criteria input. For example, the user may provide input indicating filter criteria, filter criteria may be stored in association with a user profile and accessed when the user logs in (e.g., provides a username and password), and/or the like. In various embodiments, the filter criteria may comprise one or more of item identifier (e.g., a specific tail number, a unit number, serial number, vehicle identification number (VIN), block or series number, and/or the like), an item make and/or model identifier, a modification identifier (e.g., identifying modifications associated with the item), a location (e.g., a geographical location), a security level, a skill level, a skill code (e.g., military, aviation, and/or industry skill codes), mission type, and/or the like and/or combinations thereof.

At step 1604, the relevant components and/or topics are identified based at least in part on the filter criteria. For example, the management computing entity 100 and/or user computing entity 110 identifies the relevant components and/or topics based on the filter criteria. For example, components and/or topics may be identified as relevant based on the filter criteria and header and/or preface data associated with data modules associated with the components and/or topics. At step 1606, the components and/or topics are filtered based on the identified relevant topics. For example, the management computing entity 100 and/or the user computing entity 110 may filter the topics based on the identified relevant components and/or topics.

At step 1608, the filtered topics are provided. For example, the management computing entity 100 and/or the user computing entity 110 may provide the filtered topics. For example, the component list, table of contents, model, topics listed in a component topics window 424, and/or the like may be filtered based on the filter criteria and/or the identified relevant components and/or topics. For example, the relevant components and/or topics and/or filtered component list, table of contents, visual representations representing components comprising a model, topics listed in a component topics window 424, and/or the like are displayed via the user interface. It should be understood that the components and/or topics may be filtered by a variety of criteria, combinations of criteria, and/or the like.

In some embodiments, the filter criteria will be used to filter each user interface view for a particular user, a particular user interface session, until input clearing the filter criteria is received, only for one particular user interface view (e.g., the user interface view provided in response to receiving the filter input), and/or the like.

e. Translations

In various embodiments, translations of topics may be provided. For example, a user may view a topic via the user interface in an origin/base language and request the topic be translated into a target language. For example, the topic may comprise instructions for completing a task. The instructions may comprise diagrams illustrating one or more steps and/or one or more components relevant to one or more steps. In various embodiments, a user may request a translation of the topic and/or steps for completing the task comprising the topic. In various embodiments, the entire topic may be translated into the target language. In other embodiments, only a portion of the topic is translated into the target language. For example, in some embodiments, only the verbs, or at least some of the verbs, are translated into the target language.

Figure 17A:
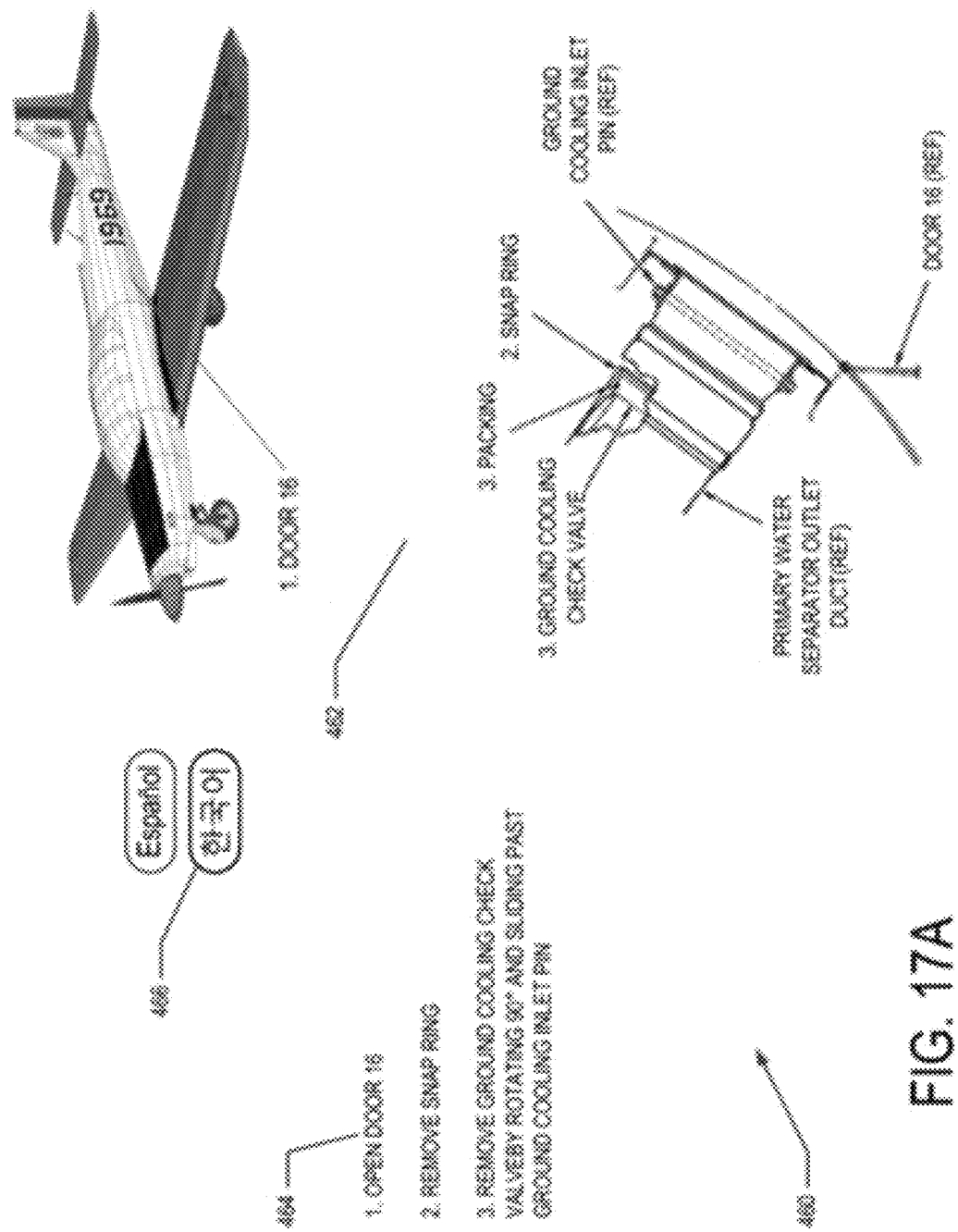
Figure 18:
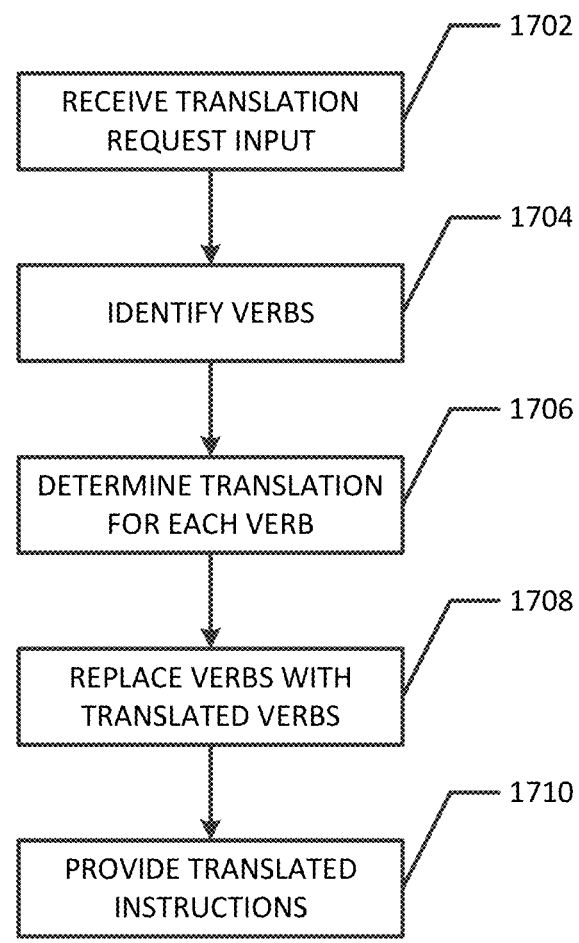

FIG. 17A provides an exemplary topic user interface view 460. Diagram(s) 462 illustrate one or more steps and/or one or more components relevant to one or more steps of the task comprising the topic, as described by instructions 464. FIG. 18 provides a flowchart illustrating processes and operations that may be completed in various embodiments to provide translated topic and/or instructions for completing a task. At step 1702, translation request input is received. For example, the management computing entity 100 and/or the user computing entity 110 may receive translation request input.

For example, a user may select translation request button 466 and/or otherwise indicate that a translation is requested. In various embodiments, the translation request input may identify at least one of an origin/base language that the topic or instructions 464 have been provided in, a target language that the user would like the topic or instructions 464 to be translated into, and/or the like.

At step 1704, at least one of the verbs in the instructions 464 is identified. In some embodiments, all of the verbs in the instructions 464 are identified. For example, step one of instructions 464 is "Open the door." "Open" is identified as one of the verbs of instructions 464 by an appropriate computing entity. For example, the management computing entity 100 and/or the user computing entity 110 may identify the verbs in the instructions 464. In various embodiments, an XML file, SGML file, database, or other file may comprise a list of verbs and the verbs in the instructions 464 may be identified based on whether a word in the instructions 464 is present in the list of verbs. In one embodiment, the data module comprising the topic may comprise one or more tags indicating which words of the instructions 464 are verbs. A variety of methods may be used to identify the verbs in the instructions 464, as appropriate for the application.

At step 1706, the translation for each identified verb into the target language is determined. For example, the management computing entity 100 and/or the user computing entity 110 may determine the translation for each identified verb into the target language. In various embodiments, an XML file, SGML file, database, or other file may comprise mappings linking verbs in an origin/base language to an appropriate translation of the verb in one or more target languages. The XML file, SGML file, database, or other file may be accessed to determine the appropriate translation of each identified verb into the target language. For example, "문을 여는" may be identified as the translation of the verb "open" in the target language of Korean.

At step 1708, the translated verbs are inserted into the instructions in place of the verbs in the origin/base language. For example, the management computing entity 100 and/or the user computing entity 110 may insert the translated verbs into the instructions in place of the verbs in the origin/base language. For example, the verb "open" in step one of the instructions 464 may be replaced by "문을 여는" for the target language of Korean.

Figure 17B:
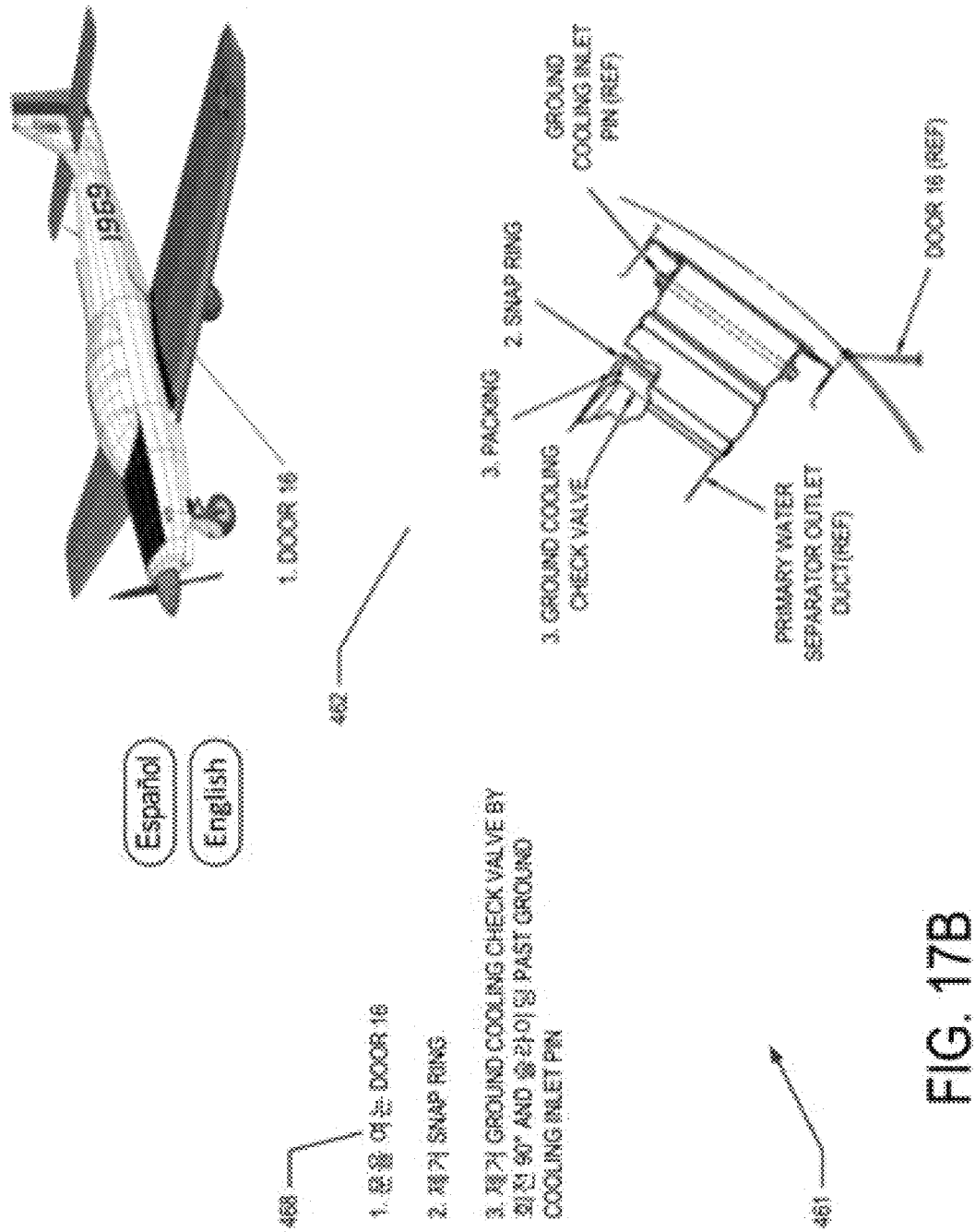

At step 1710, the translated instructions 468 are provided. For example, the management computing entity 100 and/or the user computing entity 110 may provide the translated instructions 468 (e.g., via the user interface and/or user computing entity 110). FIG. 17B provides an exemplary translated topic user interface view 461 comprising the diagram(s) 462 illustrating one or more steps and/or one or more components relevant to one or more steps of the task comprising the topic, and the translated instructions 468. The translated instructions 468 may describe the steps that should be taken to complete the task wherein the verbs are provided in the target language and the nouns, prepositions, adjectives, adverbs, and conjunctions are provided in the origin/base language. The translated instructions 468 may also comprise reference numerals or the like allowing a user to identify components referenced by the translated instructions 468 and illustrated in the diagram(s) 462. It should be understood that various methods may be used to provide translated instructions wherein a portion of the instructions (e.g., the verbs) are translated into the target language.

f. Bookmarking a Topic

In various embodiments, a user may wish to bookmark a particular topic, a particular step in a task comprising a topic, provide a bookmarked topic or step to another user, and/or the like. For example, if a user is completing a task and reaches a step that the user cannot complete due to the user's skill level, a tool that is needed but is not present, a part that is needed but is not present, the end of the user's shift, and/or the like, the user may bookmark the topic, location within the topic, step, and/or the like and may provide the bookmark to another user (e.g., a user coming in for the next shift).

Figure 19:
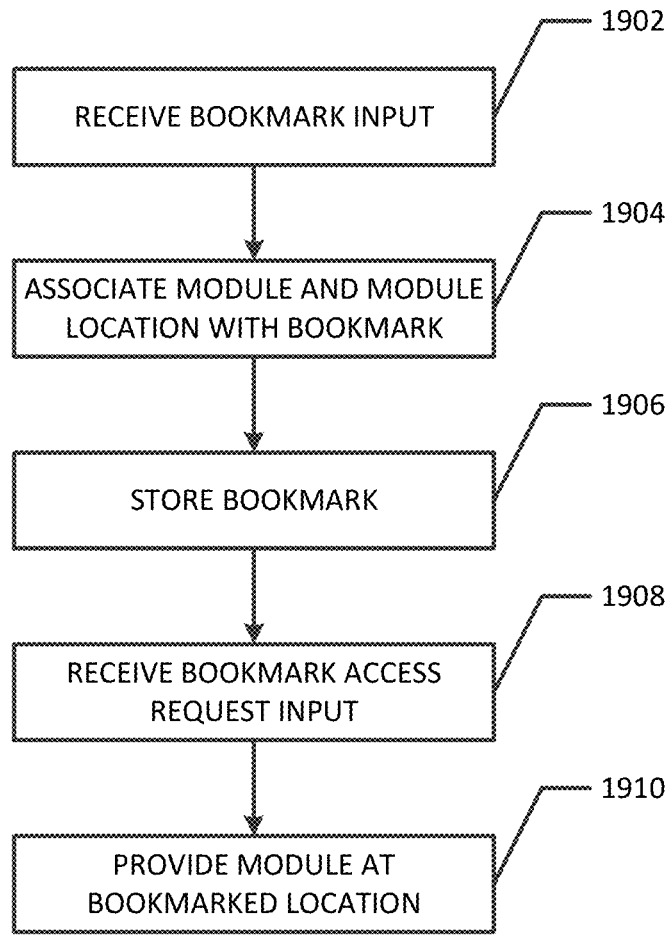

FIG. 19 provides a flowchart illustrating various processes, operations, and procedures that may be completed in accordance with various embodiments of the present invention for bookmarking a topic, portion of a topic, step, and/or the like. At step 1902, bookmark input is received. For example, the management computing entity 100 and/or the user computing entity 110 receives bookmark input. For example, the user may provide input requesting that a topic, portion of a topic, step, and/or the like be bookmarked. The bookmark input may identify bookmark data/information comprising at least one of a topic, a portion of a topic, a step, and/or the like to be bookmarked, the user requesting the bookmark, filter criteria relevant to the topic, portion of the topic, step, and/or the like, an expiration date and/or time for the bookmark, a user to which the bookmark should be provided, and/or the like. For example, the bookmark input may identify that step 5 of topic A should be bookmarked, that the bookmark should expire in 24 hours, on Mar. 30, 2015, in one week, in one month, and/or the like, that the bookmark was requested by User A, that the bookmark should be provided to User B, and/or the like.

At step 1904, the data module and/or data module location (e.g., a particular step, paragraph, table, row or column of a table, or the like) is associated with a bookmark. For example, the management computing entity 100 and/or the user computing entity 110 associates the data module and/or data module location with the bookmark. For example, the data module and/or data module location identified by bookmark input is associated with a bookmark comprising the bookmark information/data.

At step 1906, the bookmark is stored. For example, the management computing entity 100 and/or the user computing entity 110 may store the bookmark in memory 210, 215, 322, or 324. The bookmark may then be provided to the user, another user identified by the bookmark information/data, or to a group of users (e.g., users associated with the same organization or team as the user who requested the bookmark, a group of users identified by the bookmark information/data, or the like). It should be understood that a variety of methods may be used to provide the bookmark to the user, another user identified in the bookmark information/data and/or a group of users. For example, a link corresponding to the bookmark may be provided via the user interface, for example in a bookmark menu, emailed to an email address associated with the user, the user identified in the bookmark information/data, or users of the group users, and/or the like.

At step 1908, bookmark access request input is received. For example, the management computing entity 100 and/or the user computing entity 110 receives bookmark access request input. For example, the user who requested the bookmark, a user identified in the bookmark information/data, or another user may select a link or button representing the bookmark and/or the like.

At step 1910, after receiving the bookmark access request input, or in response thereto, the data module identified by the bookmark can be provided at the bookmarked location within the data module. For example, the management computing entity 100 and/or the user computing entity 110 may provide the data module identified by the bookmark can be provided at the bookmarked location within the data module (e.g., via the user interface and/or user computing entity 110).

In various embodiments, the bookmark may be stored indefinitely or until a user provides input indicating the bookmark no longer needs to be stored. In one embodiment, a user may provide an expiration date or time for the bookmark and, upon reaching the expiration date or the expiration time passing, the bookmark is no longer stored and/or deleted. It should be understood that various modifications may be made to the described method for providing a bookmark without straying from the scope of the present invention.

g. Providing Data Files and/or Modules

In various embodiments, the technical data associated with the item (e.g., data modules for topics associated with the item) may be stored and/or provided in accordance with S 1000D standards. For example, the data modules may comprise header and/or preface data in accordance with S1000D standards. In particular, S1000D standards require a document to be broken down into individual data modules that are identified via XML and/or SGML tags, labels, and/or metadata and that are organized into a hierarchical XML and/or SGML structure. In various embodiments, the XML and/or SGML files and/or data stored therein may be converted to JSON formatted data and/or files. In various embodiments, the JSON formatted data and/or files may be provided to a user computing entity 110 for display of information/data via the user interface.

Figure 20:
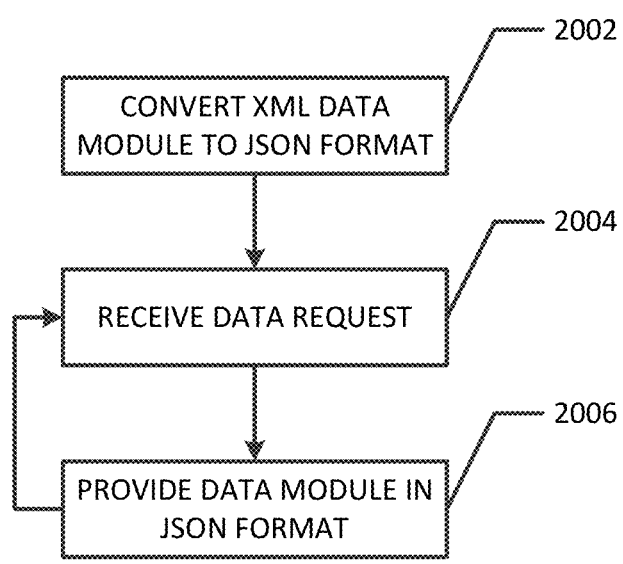

FIG. 20 provides a flowchart illustrating various processes, operations, and procedures that may be completed in various embodiments. At step 2002, one or more XML and/or SGML formatted files (e.g., data modules) are converted to JSON format. For example, the management computing entity 100 and/or the user computing entity 110 may access one or more XML and/or SGML formatted data modules and convert the data module to JSON format. The converted data modules may then be stored by the management computing entity 100 and/or the user computing entity 110. For example, the one or more JSON formatted data modules may be stored in at least one of memory 210, 215, 322, or 324. In various embodiments, the data modules converted to and/or stored in JSON format may be in accordance with S1000D standards. For example, the data modules converted to and/or stored in JSON format may be configured to permit the updating of single data modules without necessarily changing the path down the XML tree or other hierarchical structure which points to them. By partitioning and classifying the information/data associated with the item in this way, the information/data can be shared among many publications and updating of data/information within data modules in the underlying S1000D (e.g., XML, SGML, or other hierarchically structured) document will automatically update the dependent publications.

At step 2004, a data request is received. For example, the management computing entity 100 and/or the user computing entity 110 may receive a data request. For example, a user (e.g., operating a user computing entity 110) may select a component, topic, request a link preview or smart preview, and/or the like via the user interface. The data request may identify a particular data module. At step 2006, the data module can be provided in JSON format. For example, the management computing entity 100 and/or the user computing entity 110 may provide the data module in JSON format and at least a portion of the data module may be provided via the user interface (e.g., operating on the user computing entity 110). For example, the data module identified by the received data request may be provided in JSON format. Providing the data module(s) in JSON format may allow the data module(s) to be transmitted and/or processed more quickly than if the data module(s) were provided in XML and/or SGML format.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. A method for interacting with a digital model of an item to access technical data associated with the item, the method comprising the steps of:
   causing display, by one or more processors of a user computing entity, of the digital model of the item via a user interface executing on the user computing entity, wherein (a) the digital model comprises one or more components of the item, and (b) the one or more components are selectable via the user interface;
   receiving, by the one or more processors, a first type of input via the user interface associated with a first component of the one or more components of the digital model;
   responsive to receiving the first type of input associated with the first component of the one or more components, generating a topics window comprising a listing of a plurality of topics associated with the first component of the one or more components, wherein each of the plurality of topics is selectable via the user interface;
   causing display, by the one or more processors, of the topics window via the user interface, wherein the topics window is superimposed on at least a portion of the digital model;
   receiving, by the one or more processors, a second type of input via the user interface selecting a first topic of the plurality of topics from the topics window, wherein the second type of input is different than the first type of input; and
   responsive to receiving the second type of input selecting the first topic of the plurality of topics via the user interface:
   (a) generating, by the one or more processors, a smart preview window, wherein (i) generating the smart preview window comprises suppressing preface data of the technical data associated with the first topic, and (ii) the smart preview window does not comprise the preface data for the first topic and comprises at least a portion of the technical data for the first topic, and
   (b) causing display, by the one or more processors, of the smart preview window via the user interface, wherein the smart preview window is superimposed on at least a portion of the digital model and on at least a portion of the topics window.

2. The method of claim 1, wherein (a-1) the one or more components are selected from the group consisting of an assembly, a sub-assembly, a sub-sub-assembly, a system, a subsystem, a sub-subsystem, and a part, (b-1) the technical data is stored in accordance with S1000D standards, and (c-1) the technical data is provided in JavaScript Object Notation (JSON) format.

3. The method of claim 1 further comprising:
   responsive to having a link preview configuration setting and receiving the second type of input selecting the first topic of the plurality of topics:
   (a-1) generating, by the one or more processors, a link preview window, wherein the link preview window comprises at least a portion of preface data for the first topic and at least a portion of the technical data for the first topic, and
   (b-1) causing display, by the one or more processors, of the link preview window via the user interface, wherein the link preview window is superimposed on at least a portion of the digital model and on at least a portion of the topics window.

4. The method of claim 1 further comprising:
   receiving input requesting translation of the technical data, wherein the technical data is in an origin language and the input requesting translation identifies a target language;
   identifying a plurality of verbs in the technical data;
   translating the plurality of verbs in the technical data from the origin language to the target language; and
   providing the technical data, wherein the plurality of verbs in the technical data is provided in the target language and the remainder of the technical data is provided in the origin language.

5. The method of claim 1, wherein (a-1) the one or more components are in a component list, and (b-1) the component list is organized according to a hierarchy comprising a plurality of levels.

6. The method of claim 5 further comprising:
   receiving input indicating a threshold hierarchy level;
   generating a level-limited component list comprising at least a portion of the one or more components associated with a level equal to or less than the threshold hierarchy level; and
   providing the level-limited component list.

7. The method of claim 1, wherein (a-1) the digital model is selected from the group consisting of a two-dimensional representation of the item and a three-dimensional representation of the item and (b-1) the digital model view is selected from the group consisting of an exploded view, a top view, a side view, a bottom view, a front view, a back view, a cross-sectional view, and a partial view.

8. The method of claim 1 further comprising:
   receiving a filter request, the filter request comprising one or more filter criteria; and
   identifying one or more topics satisfying the one or more filter criteria.

9. The method of claim 8 wherein the one or more filter criteria is selected from the group consisting of an item identifier, an item model identifier, a modification identifier, a location, a security level, a skill level, a skill code, and a mission type.

10. A user computing entity for interacting with a digital model of an item to access technical data associated with the item, the user computing entity comprising at least one processor and at least one memory including computer program code, the at least one memory and the computer program code configured to, with the processor, cause the user computing entity to at least:

cause display of the digital model of the item via a user interface executing on the user computing entity, wherein (a) the digital model comprises one or more components of the item, and (b) the one or more components are selectable via the user interface;

receive a first type of input via the user interface associated with a first component of the one or more components of the digital model;

responsive to receiving the first type of input associated with the first component of the one or more components, generate a topics window comprising a listing of a plurality of topics associated with the first component of the one or more components, wherein each of the plurality of topics is selectable via the user interface;

cause display of the topics window via the user interface, wherein the topics window is superimposed on at least a portion of the digital model;

receive a second type of input via the user interface selecting a first topic of the plurality of topics from the topics window, wherein the second type of input is different than the first type of input; and responsive to receiving the second type of input selecting the first topic of the plurality of topics via the user interface:
  (a) generate a smart preview window, wherein (i) generating the smart preview window comprises suppressing preface data of the technical data associated with the first topic, and (ii) the smart preview window does not comprise the preface data for the first topic and comprises at least a portion of the technical data for the first topic, and
  (b) cause display of the smart preview window via the user interface, wherein the smart preview window is superimposed on at least a portion of the digital model and on at least a portion of the topics window.

11. The user computing entity of claim 10, wherein (a-1) the one or more components are selected from the group consisting of an assembly, a sub-assembly, a sub-sub-assembly, a system, a subsystem, a sub-subsystem, and a part, (b-1) the technical data is stored in accordance with S1000D standards, and (c-1) the technical data is provided in JavaScript Object Notation (JSON) format.

12. The user computing entity of claim 10, wherein the at least one memory and the computer program code configured to, with the processor, further cause the user computing entity to at least:

responsive to having a link preview configuration setting and receiving the second type of input selecting the first topic of the plurality of topics:
  (a-1) generate a link preview window, wherein the link preview window comprises at least a portion of preface data for the first topic and at least a portion of the technical data for the first topic, and
  (b-1) cause display of the link preview window via the user interface, wherein the link preview window is superimposed on at least a portion of the digital model and on at least a portion of the topics window.

13. The user computing entity of claim 10, wherein the at least one memory and the computer program code configured to, with the processor, further cause the user computing entity to at least:

receive input requesting translation of the technical data, wherein the technical data is in an origin language and the input requesting translation identifies a target language;

identify a plurality of verbs in the technical data;

translate the plurality of verbs in the technical data from the origin language to the target language; and provide the technical data, wherein the plurality of verbs in the technical data is provided in the target language and the remainder of the technical data is provided in the origin language.

14. The user computing entity of claim 10, wherein (a-1) the one or more components are in a component list, and (b-1) the component list is organized according to a hierarchy comprising a plurality of levels.

15. The user computing entity of claim 10, wherein the at least one memory and the computer program code configured to, with the processor, further cause the user computing entity to at least:

receive input indicating a threshold hierarchy level;

generate a level-limited component list comprising at least a portion of the one or more components associated with a level equal to or less than the threshold hierarchy level; and provide the level-limited component list.

16. The user computing entity of claim 10, wherein (a-1) the digital model is selected from the group consisting of a two-dimensional representation of the item and a three-dimensional representation of the item and (b-1) the digital model view is selected from the group consisting of an exploded view, a top view, a side view, a bottom view, a front view, a back view, a cross-sectional view, and a partial view.

17. The user computing entity of claim 10, wherein the at least one memory and the computer program code configured to, with the processor, further cause the user computing entity to at least:

receive a filter request, the filter request comprising one or more filter criteria; and identify one or more topics satisfying the one or more filter criteria.

18. A computer program product interacting with a digital model of an item to access technical data associated with the item, the computer program product comprising at least one non-transitory computer-readable storage medium having computer-readable program code portions stored therein, the computer-readable program code portions comprising:

an executable portion configured to cause display of the digital model of the item via a user interface executing on the user computing entity, wherein (a) the digital model comprises one or more components of the item, and (b) the one or more components are selectable via the user interface;

an executable portion configured to receive a first type of input via the user interface associated with a first component of the one or more components of the digital model;

an executable portion configured to, responsive to receiving the first type of input associated with the first component of the one or more components, generate a topics window comprising a listing of a plurality of topics associated with the first component of the one or more components, wherein each of the plurality of topics is selectable via the user interface;

an executable portion configured to cause display of the topics window via the user interface, wherein the topics window is superimposed on at least a portion of the digital model;

an executable portion configured to receive a second type of input via the user interface selecting a first topic of the plurality of topics from the topics window, wherein the second type of input is different than the first type of input; and an executable portion configured to, responsive to receiving the second type of input selecting the first topic of the plurality of topics via the user interface:
(a) generate a smart preview window, wherein (i) generating the smart preview window comprises suppressing preface data of the technical data associated with the first topic, and (ii) the smart preview window does not comprise the preface data for the first topic and comprises at least a portion of the technical data for the first topic, and
(b) cause display of the smart preview window via the user interface, wherein the smart preview window is superimposed on at least a portion of the digital model and on at least a portion of the topics window.

19. The computer program product of claim 18, wherein (a-1) the one or more components are selected from the group consisting of an assembly, a sub-assembly, a sub-sub-assembly, a system, a subsystem, a sub-subsystem, and a part, (b-1) the technical data is stored in accordance with S1000D standards, and (c-1) the technical data is provided in JavaScript Object Notation (JSON) format.

20. The computer program product of claim 18, wherein (a-1) the digital model is selected from the group consisting of a two-dimensional representation of the item and a three-dimensional representation of the item and (b-1) the digital model view is selected from the group consisting of an exploded view, a top view, a side view, a bottom view, a front view, a back view, a cross-sectional view, and a partial view.

* * * * *